(12) United States Patent
Hagimori et al.

(10) Patent No.: US 6,449,433 B2
(45) Date of Patent: Sep. 10, 2002

(54) TAKING LENS DEVICE

(75) Inventors: Hitoshi Hagimori, Ikoma; Tetsuo Kohno, Suita; Masashi Isono, Sakai, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/826,600

(22) Filed: Apr. 5, 2001

(30) Foreign Application Priority Data

Apr. 7, 2000 (JP) ........................................ 2000-111927
Dec. 4, 2000 (JP) ........................................ 2000-368339

(51) Int. Cl.[7] ............................ G03B 5/00; G02B 9/60; G02B 9/34; G02B 9/62
(52) U.S. Cl. ............................ 396/72; 395/79; 348/358; 348/342; 359/684; 359/686; 359/713; 359/714; 359/715; 359/757; 359/766; 359/773
(58) Field of Search ...................... 396/79, 72; 359/684, 359/686, 713, 714, 715, 757, 766, 773; 348/358, 342

(56) References Cited

U.S. PATENT DOCUMENTS 6,025,962 A * 2/2000 Suzuki ........................ 359/766
6,084,723 A * 7/2000 Matsuzawa et al. .... 359/766 X
6,246,833 B1 * 6/2001 Harada ........................ 396/79

FOREIGN PATENT DOCUMENTS

| JP | 04-296809 A | 10/1992 | |
|---|---|---|---|
| JP | 05-341189 A | 12/1993 | |
| JP | 10-111457 A | 4/1998 | |
| JP | 020001877155 A | * 7/2000 | ........... G02B/13/00 |

* cited by examiner

Primary Examiner—W. B. Perkey
(74) Attorney, Agent, or Firm—Sidley Austin Brown & Wood LLP

(57) ABSTRACT

A taking lens device has a zoom lens system having an optical system that is comprised of a plurality of lens units and that achieves zooming by varying the unit-to-unit distances and an image sensor that converts an optical image formed by the zoom lens system into an electric signal. The zoom lens system is comprised of, from the object side, a first lens unit having a positive optical power, a second lens unit having a negative optical power, a third lens unit having a positive optical power, and a fourth lens unit having a negative optical power. At least one of the following conditional formula is fulfilled: $1.1 < f1/fT < 2.5$, where $f1$ represents the focal length of the first lens unit, and $fT$ represents the focal length of the entirety optical system at the telephoto end, and $0.3 < D_{34W}/D_{34T} < 2.5$ where $D_{34W}$ and $D_{34T}$ represent axial distance between the third lens unit and the fourth lens unit at wide-angle end and telephoto end, respectively.

25 Claims, 23 Drawing Sheets

FNO=2.55
W
——— d
— — — g
— — — SC
-0.5   0.5
SPHERICAL ABERRATION
SINE CONDITION

Y'=5.5
— — — DM
——— DS
-0.5   0.5
ASTIGMATISM

Y'=5.5
-10.0   10.0
DISTORTION %

FNO=2.96
M
——— d
— — — g
— — — SC
-0.5   0.5
SPHERICAL ABERRATION
SINE CONDITION

Y'=5.5
— — — DM
——— DS
-0.5   0.5
ASTIGMATISM

Y'=5.5
-10.0   10.0
DISTORTION %

FNO=3.60
T
——— d
— — — g
— — — SC
-0.5   0.5
SPHERICAL ABERRATION
SINE CONDITION

Y'=5.5
— — — DM
——— DS
-0.5   0.5
ASTIGMATISM

Y'=5.5
-10.0   10.0
DISTORTION %

FNO=2.48
W
— d
— — — g
— — — SC
−0.5   0.5
SPHERICAL ABERRATION
SINE CONDITION

Y'=5.5
— — — DM
——— DS
−0.5   0.5
ASTIGMATISM

Y'=5.5
−10.0   10.0
DISTORTION %

FNO=3.07
M
— d
— — — g
— — — SC
−0.5   0.5
SPHERICAL ABERRATION
SINE CONDITION

Y'=5.5
— — — DM
——— DS
−0.5   0.5
ASTIGMATISM

Y'=5.5
−10.0   10.0
DISTORTION %

FNO=3.60
T
— d
— — — g
— — — SC
−0.5   0.5
SPHERICAL ABERRATION
SINE CONDITION

Y'=5.5
— — — DM
——— DS
−0.5   0.5
ASTIGMATISM

Y'=5.5
−10.0   10.0
DISTORTION %

FNO=2.88
W
—— d
——— g
—·— SC
-0.5  0.5
SPHERICAL ABERRATION
SINE CONDITION

Y'=5.5
——— DM
—— DS
-0.5  0.5
ASTIGMATISM

Y'=5.5
-10.0  10.0
DISTORTION %

FNO=3.04
M
—— d
——— g
—·— SC
-0.5  0.5
SPHERICAL ABERRATION
SINE CONDITION

Y'=5.5
——— DM
—— DS
-0.5  0.5
ASTIGMATISM

Y'=5.5
-10.0  10.0
DISTORTION %

FNO=3.63
T
—— d
——— g
—·— SC
-0.5  0.5
SPHERICAL ABERRATION
SINE CONDITION

Y'=5.5
——— DM
—— DS
-0.5  0.5
ASTIGMATISM

Y'=5.5
-10.0  10.0
DISTORTION %

FNO=2.43

Y'=5.5

Y'=5.5

FNO=3.17

Y'=5.5

Y'=5.5

FNO=3.60

Y'=5.5

Y'=5.5

FNO=2.55

W
—— d
—·— g
----- SC

-0.5    0.5
SPHERICAL ABERRATION
SINE CONDITION

Y'=5.5

----- DM
—— DS

-0.5    0.5
ASTIGMATISM

Y'=5.5

-10.0    10.0
DISTORTION %

FNO=3.60

M
—— d
—·— g
----- SC

-0.5    0.5
SPHERICAL ABERRATION
SINE CONDITION

Y'=5.5

----- DM
—— DS

-0.5    0.5
ASTIGMATISM

Y'=5.5

-10.0    10.0
DISTORTION %

FNO=3.60

T
—— d
—·— g
----- SC

-0.5    0.5
SPHERICAL ABERRATION
SINE CONDITION

Y'=5.5

----- DM
—— DS

-0.5    0.5
ASTIGMATISM

Y'=5.5

-10.0    10.0
DISTORTION %

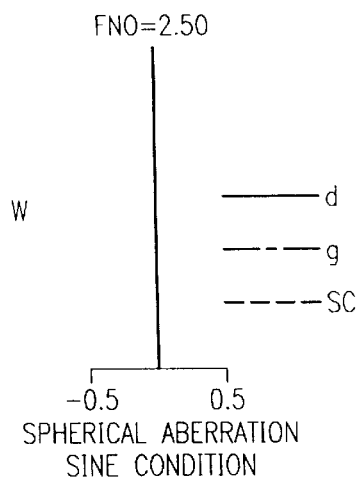
FIG. 16A
FNO=2.50
FIG. 16B
Y'=5.5
FIG. 16C
Y'=5.5
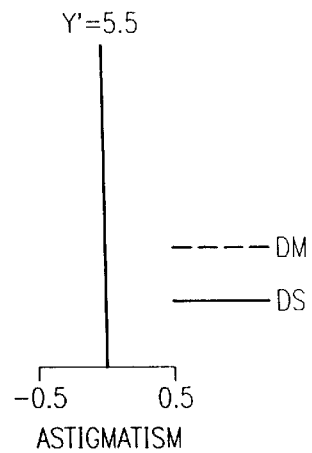
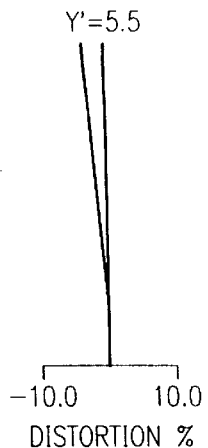
-0.5  0.5
SPHERICAL ABERRATION
SINE CONDITION
-0.5  0.5
ASTIGMATISM
-10.0  10.0
DISTORTION %
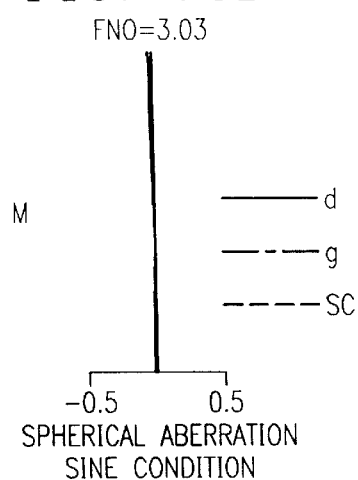
FIG. 16D
FNO=3.03
FIG. 16E
Y'=5.5
FIG. 16F
Y'=5.5
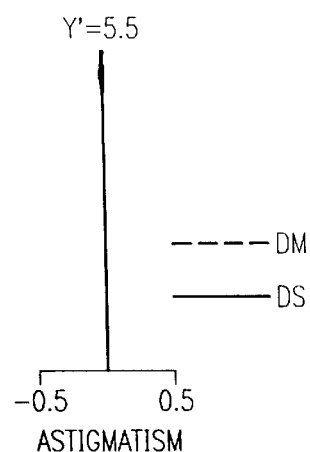
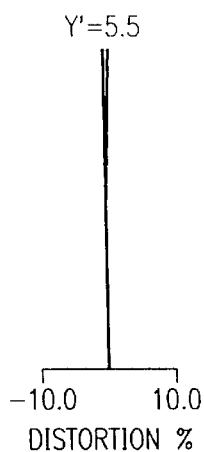
-0.5  0.5
SPHERICAL ABERRATION
SINE CONDITION
-0.5  0.5
ASTIGMATISM
-10.0  10.0
DISTORTION %
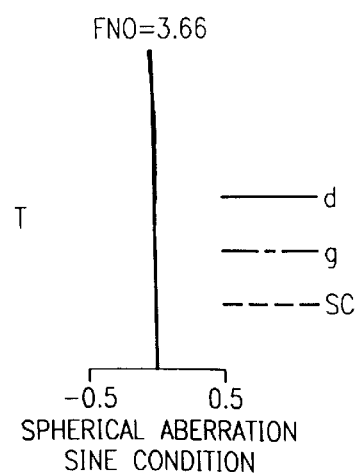
FIG. 16G
FNO=3.66
FIG. 16H
Y'=5.5
FIG. 16I
Y'=5.5
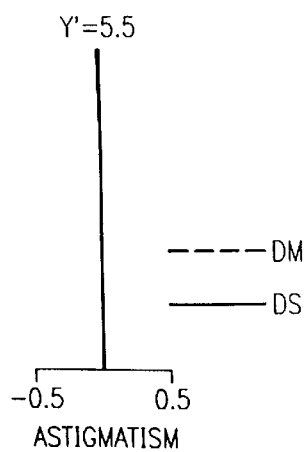
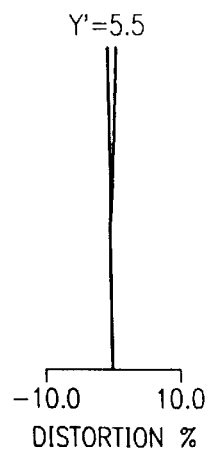
-0.5  0.5
SPHERICAL ABERRATION
SINE CONDITION
-0.5  0.5
ASTIGMATISM
-10.0  10.0
DISTORTION %

FNO=2.17

Y'=5.5

Y'=5.5

FNO=2.89

Y'=5.5

Y'=5.5

FNO=3.60

Y'=5.5

Y'=5.5

FNO=2.10
W
—— d
—·—·— g
- - - - - SC
-0.5   0.5
SPHERICAL ABERRATION
SINE CONDITION

Y'=5.5
- - - - - DM
—— DS
-0.5   0.5
ASTIGMATISM

Y'=5.5
-10.0   10.0
DISTORTION %

FNO=2.84
M
—— d
—·—·— g
- - - - - SC
-0.5   0.5
SPHERICAL ABERRATION
SINE CONDITION

Y'=5.5
- - - - - DM
—— DS
-0.5   0.5
ASTIGMATISM

Y'=5.5
-10.0   10.0
DISTORTION %

FNO=3.60
T
—— d
—·—·— g
- - - - - SC
-0.5   0.5
SPHERICAL ABERRATION
SINE CONDITION

Y'=5.5
- - - - - DM
—— DS
-0.5   0.5
ASTIGMATISM

Y'=5.5
-10.0   10.0
DISTORTION %

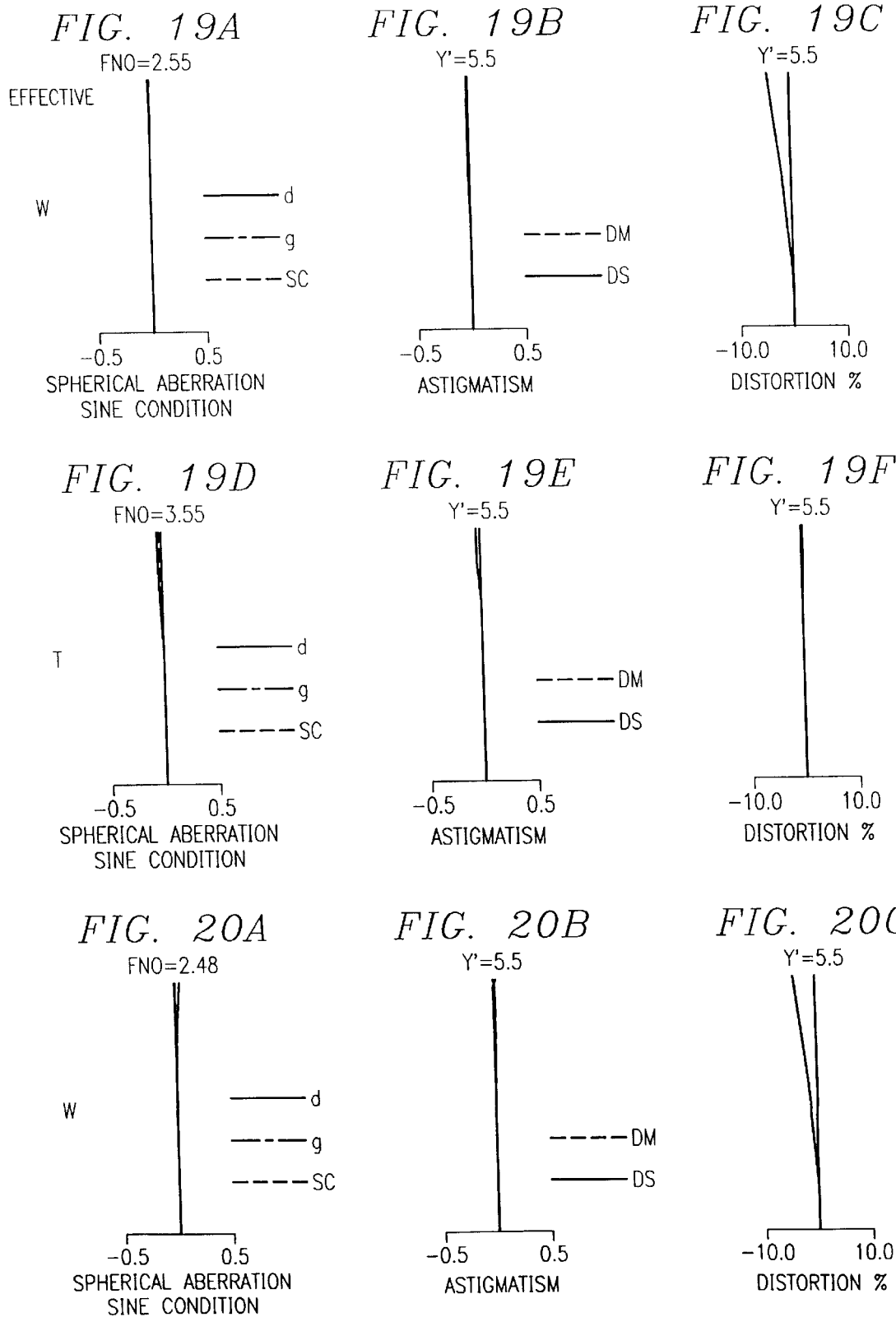

FNO=3.57
SPHERICAL ABERRATION
SINE CONDITION

Y'=5.5
ASTIGMATISM

Y'=5.5
DISTORTION %

FNO=2.23
SPHERICAL ABERRATION
SINE CONDITION

Y'=5.5
ASTIGMATISM

Y'=5.5
DISTORTION %

FNO=3.92
SPHERICAL ABERRATION
SINE CONDITION

Y'=5.5
ASTIGMATISM

Y'=5.5
DISTORTION %

FNO=2.87

Y'=5.5

Y'=5.5

FNO=3.65

Y'=5.5

Y'=5.5

FNO=2.42

Y'=5.5

Y'=5.5

FNO=3.24
T
-0.5  0.5
SPHERICAL ABERRATION
SINE CONDITION
— d
—·— g
----- SC

Y'=5.5
-0.5  0.5
ASTIGMATISM
----- DM
—— DS

Y'=5.5
-10.0  10.0
DISTORTION %

FNO=2.17
W
-0.5  0.5
SPHERICAL ABERRATION
SINE CONDITION
— d
—·— g
----- SC

Y'=5.5
-0.5  0.5
ASTIGMATISM
----- DM
—— DS

Y'=5.5
-10.0  10.0
DISTORTION %

FNO=3.99
T
-0.5  0.5
SPHERICAL ABERRATION
SINE CONDITION
— d
—·— g
----- SC

Y'=5.5
-0.5  0.5
ASTIGMATISM
----- DM
—— DS

Y'=5.5
-10.0  10.0
DISTORTION %

FNO=2.11

Y'=5.5

Y'=5.5

FNO=3.98

Y'=5.5

Y'=5.5

TAKING LENS DEVICE

This application is based on Japanese Patent Applications Nos. 2000-111927 and 2000-368339, filed on Apr. 7, 2000 and Dec. 4, 2000, respectively, the contents of which are hereby incorporated by reference.

FIELD OF THE INVENTION

The present invention relates to an optical or taking lens device. More specifically, the present invention relates to an optical or taking lens device that optically takes in an image of a subject through an optical system and that then outputs the image as an electrical signal by means of an image sensor. For example, a taking lens device that is used as a main component of a digital still camera, a digital video camera, or a camera that is incorporated in, or externally fitted to, a device such as a digital video unit, a personal computer, a mobile computer, a portable telephone, or a personal digital assistant (PDA). The present invention relates particularly to an optical or taking lens device provided with a compact, high-zoom- ratio zoom lens system.

DESCRIPTION OF PRIOR ART

Conventionally, the majority of high-zoom-ratio zoom lenses for digital cameras are of the type comprised of, from the object side, a first lens unit having a positive optical power, a second lens unit having a negative optical power, a third lens unit having a positive optical power, and a fourth lens unit having a positive optical power (for example, Japanese Patent Application Laid-Open No. H4-296809). This is because a positive-negative-positive-positive configuration excels in compactness.

On the other hand, as zoom lenses that offer higher zoom ratios are known zoom lenses of the type comprised of, from the object side, a first lens unit having a positive optical power, a second lens unit having a negative optical power, a third lens unit having a positive optical power, and a fourth lens unit having a negative optical power (for example, Japanese Patent Application Laid-Open No. H5-341189) and zoom lenses of the type comprised of, from the object side, a first lens unit having a positive optical power, a second lens unit having a negative optical power, a third lens unit having a positive optical power, a fourth lens unit having a negative optical power, and a fifth lens unit having a positive optical power (for example, Japanese Patent Application Laid-Open No. H10-111457).

However, in the zoom lens of a positive-negative-positive-negative configuration proposed in Japanese Patent Application Laid-Open No. H5-341189, mentioned above, the first lens unit is kept stationary during zooming, and therefore this zoom lens is unfit for further improvement for higher performance necessitated by the trend toward higher zoom ratios and smaller image-sensor pixel pitches. On the other hand, in the zoom lens of a positive-negative-positive-negative-positive configuration proposed in Japanese Patent Application Laid-Open No. H10-111457, mentioned above, the first lens unit is moved during zooming, but the individual lens units, in particular the first and second lens units, are given strong optical powers and thus cause large aberrations. This makes it difficult to achieve higher performance necessitated by the trend toward higher zoom ratios and smaller image-sensor pixel pitches. In addition, a configuration including a positive-negative-positive-negative sequence, in which the fourth lens unit is negative, is somewhat inferior in compactness to a positive-negative-positive-positive configuration.

SUMMARY OF THE INVENTION

An object of the present invention is to provide a zoom lens configuration that is superior in compactness to a positive-negative-positive-positive configuration but that still offers satisfactory performance. In particular, an object of this invention is to provide an optical or taking lens device provided with a high-zoom-ratio zoom lens system that offers a zoom ratio of about 7× to 10× and an f-number of about 2.5 to 4, that offers such high performance that it can be used as an optical system for use with a leading-edge image sensor with a very small pixel pitch, and that excels in compactness.

To achieve the above object, according to one aspect of the present invention, an optical or taking lens device is provided with: a zoom lens system that is comprised of a plurality of lens units and that achieves zooming by varying the unit-to-unit distances; and an image sensor that converts an optical image formed by the zoom lens system into an electrical signal. The zoom lens system comprises at least, from the object side thereof to an image side thereof, a first lens unit having a positive optical power, a second lens unit having a negative optical power, a third lens unit having a positive optical power, and a fourth lens unit having a negative optical power. Here, the following conditional formula is fulfilled:

$$1.1 < f1/fT < 2.5$$

where $f1$ represents the focal length of the first lens unit; and $fT$ represents the focal length of the entire optical system at the telephoto end.

According to another aspect of the present invention, an optical, or taking lens device is provided with: a zoom lens system that is comprised of a plurality of lens units which achieves zooming by varying the unit-to-unit distances; and an image sensor for converting an optical image formed by the zoom lens system into an electrical signal. The zoom lens system comprises at least, from an object side thereof to an image side thereof, a first lens unit having a positive optical power, a second lens unit having a negative optical power, a third lens unit having a positive optical power, and a fourth lens unit having a negative optical power. The first lens unit is moved as zooming is performed. Here, the following conditional formula is fulfilled:

$$0.3 < D_{34W}/D_{34T} < 2.5$$

where $D_{34W}$ represents the aerial distance between the third lens unit and the fourth lens unit at the wide-angle end; and $D_{34T}$ represents the aerial distance between the third lens unit and the fourth lens unit at the telephoto end.

BRIEF DESCRIPTION OF THE DRAWINGS

This and other objects and features of the present invention will become clear from the following description, taken in conjunction with the preferred embodiments with reference to the accompanying drawings in which:

FIGS. 16A to 16I are aberration diagrams of Example 7, as observed when focused at infinity;

FIGS. 19A to 19F are aberration diagrams of Example 1, as observed when focused at a close-up distance (D=0.5 m);

FIGS. 20A to 20F are aberration diagrams of Example 2, as observed when focused at a close-up distance (D=0.5 m);

DESCRIPTION OF THE PREFERRED EMBODIMENTS

Figure 1:
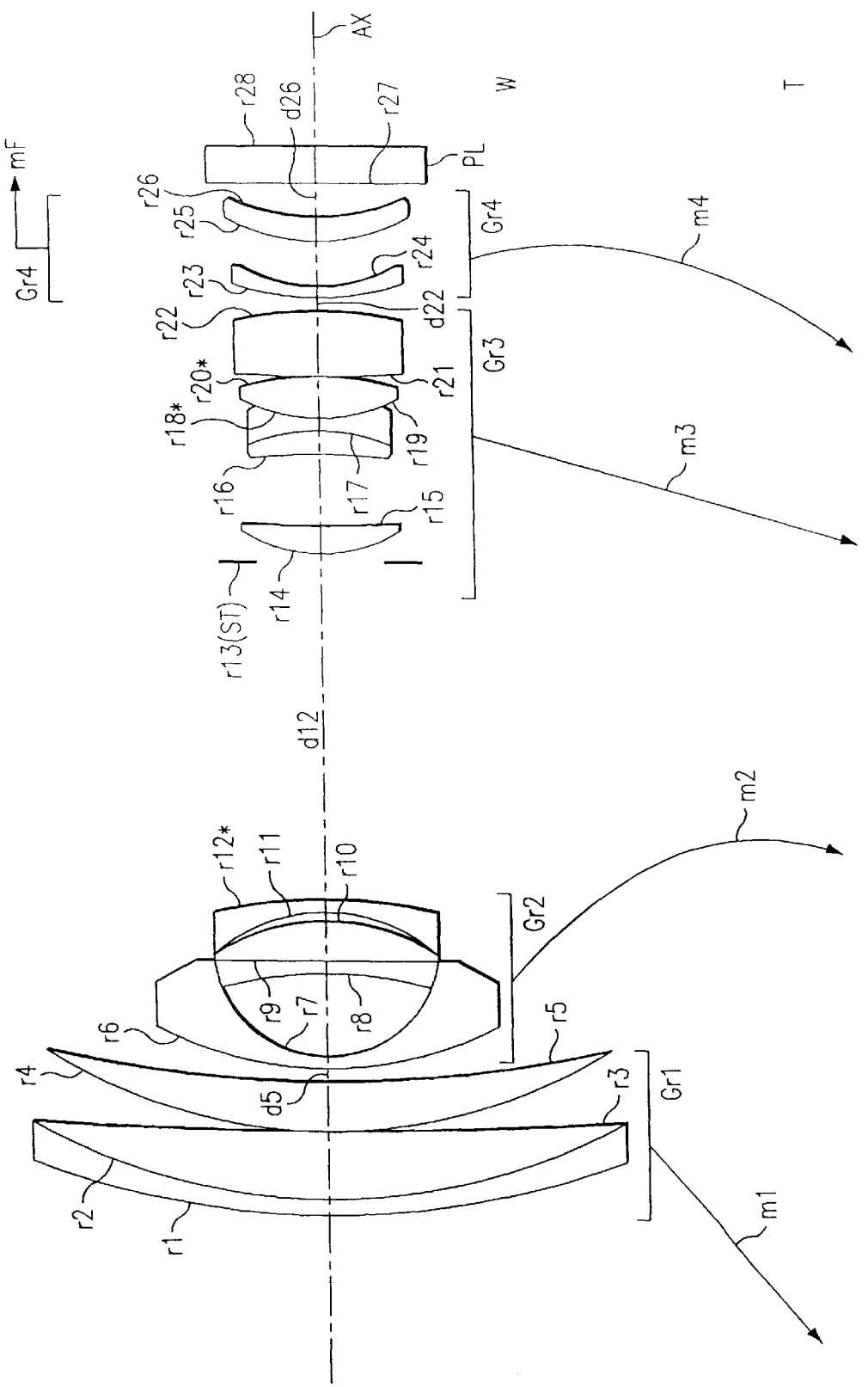
FIG. 1 is a lens arrangement diagram of a first embodiment (Example 1) of the invention.
Figure 2:
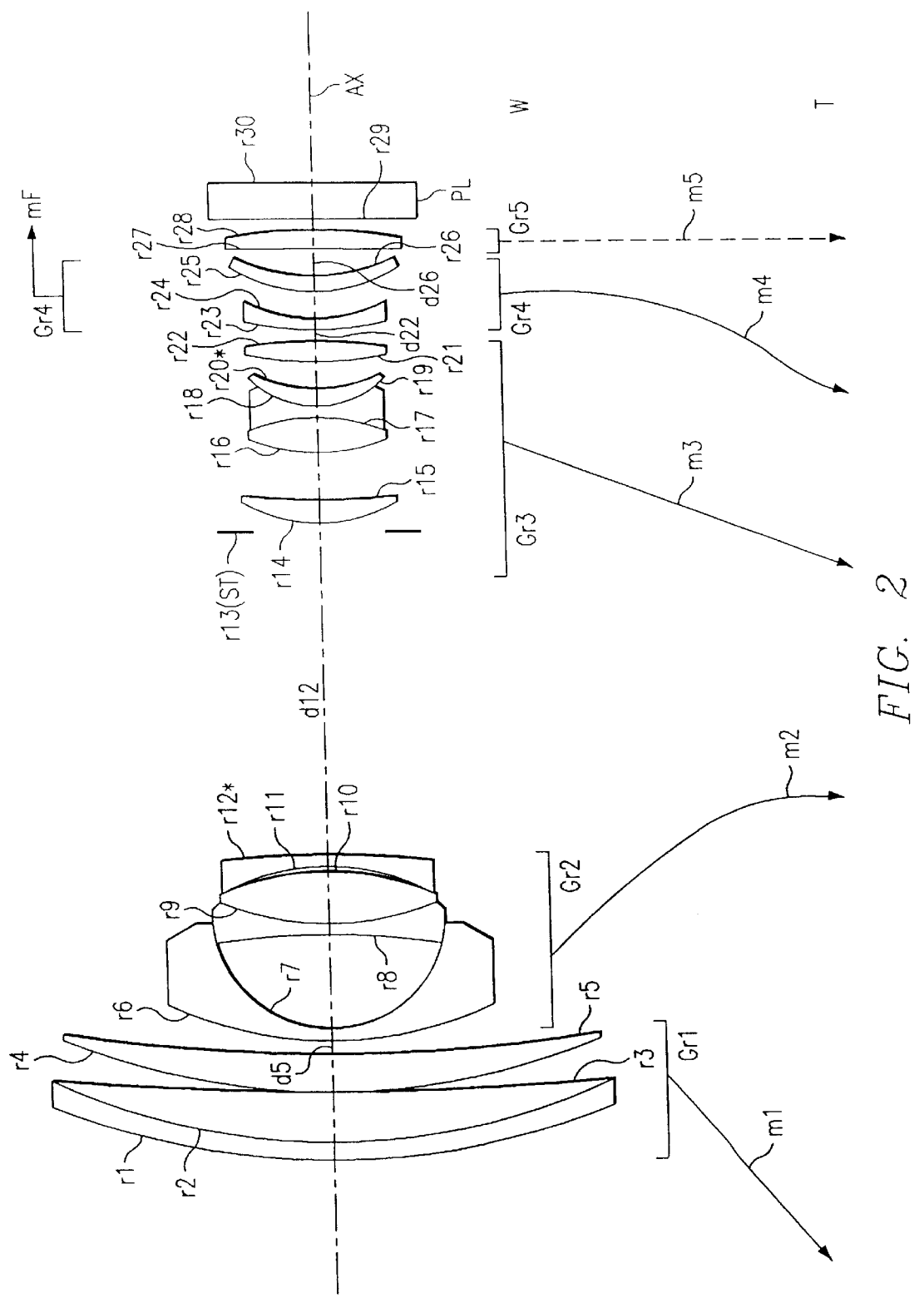
FIG. 2 is a lens arrangement diagram of a second embodiment (Example 2) of the invention.
Figure 3:
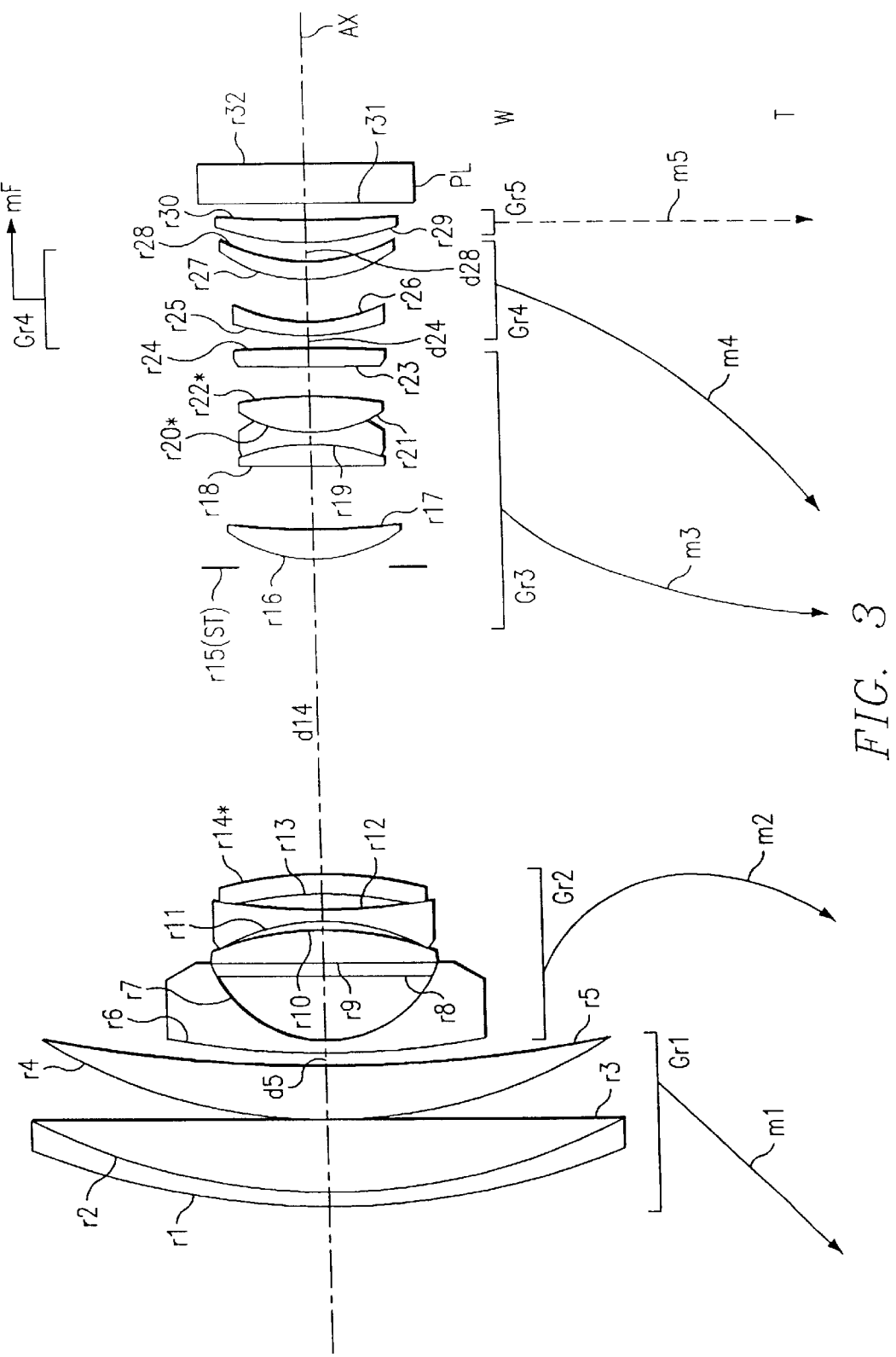
FIG. 3 is a lens arrangement diagram of a third embodiment (Example 3) of the invention.
Figure 4:
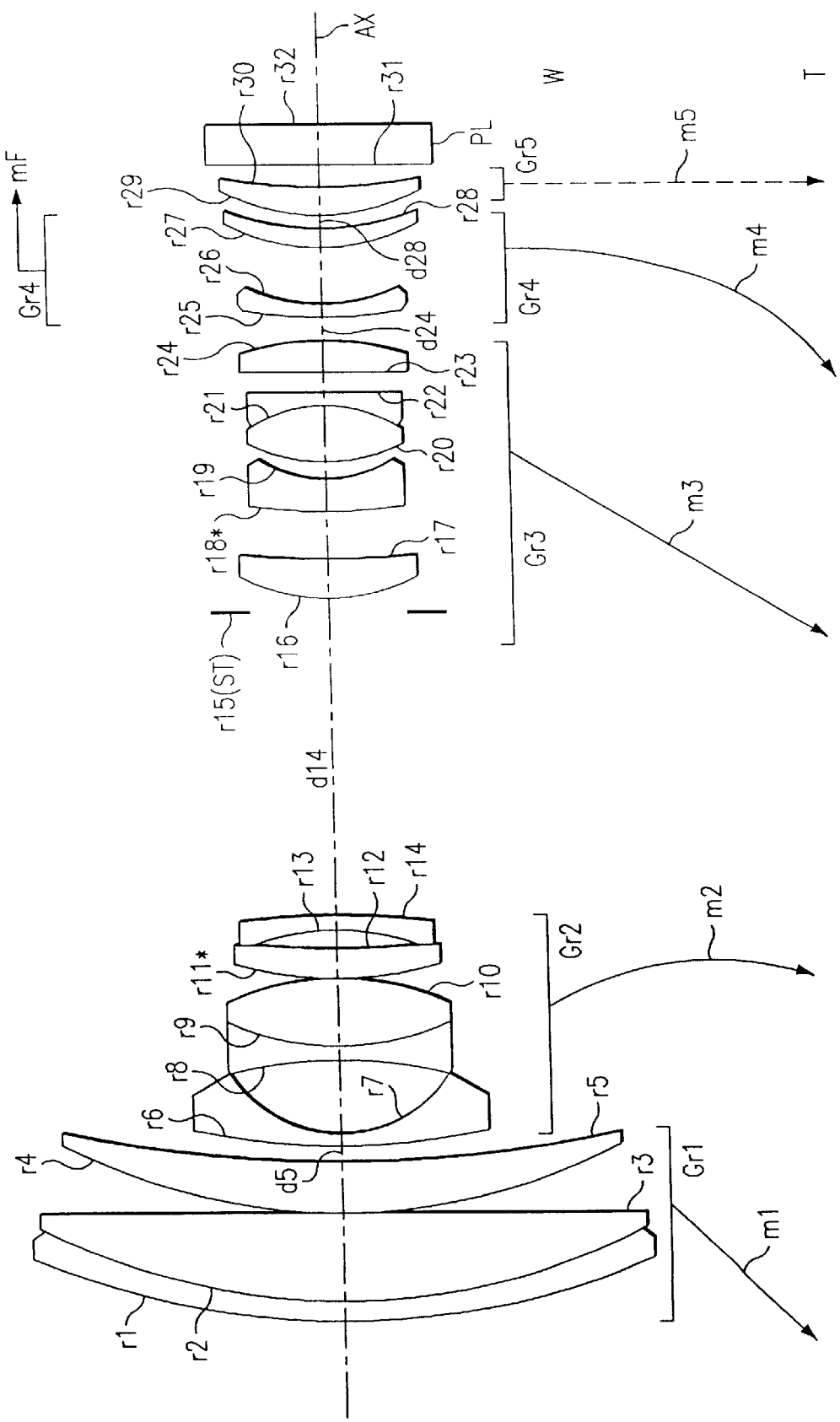
FIG. 4 is a lens arrangement diagram of a fourth embodiment (Example 4) of the invention.
Figure 5:
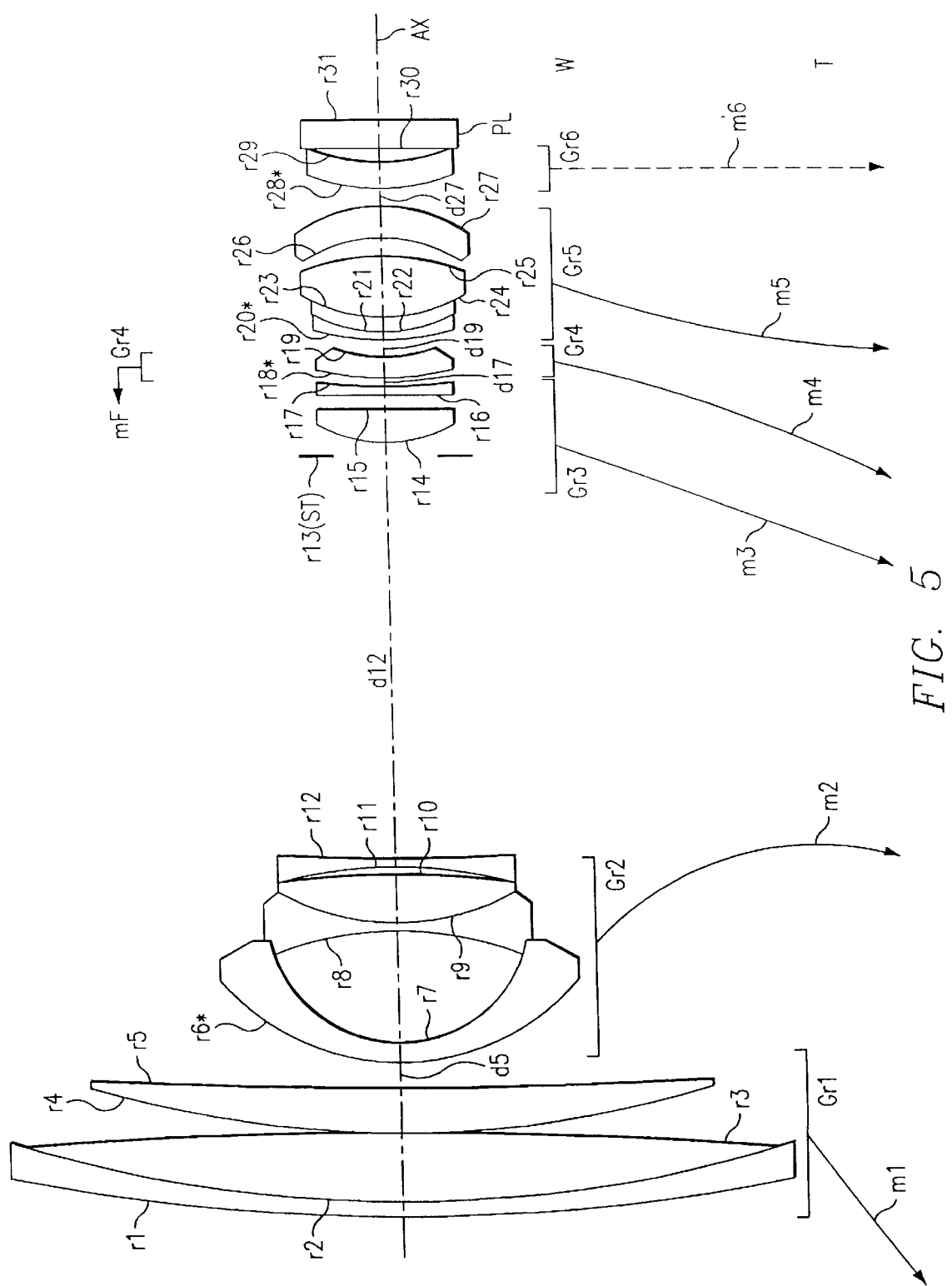
FIG. 5 is a lens arrangement diagram of a fifth embodiment (Example 5) of the invention.
Figure 6:
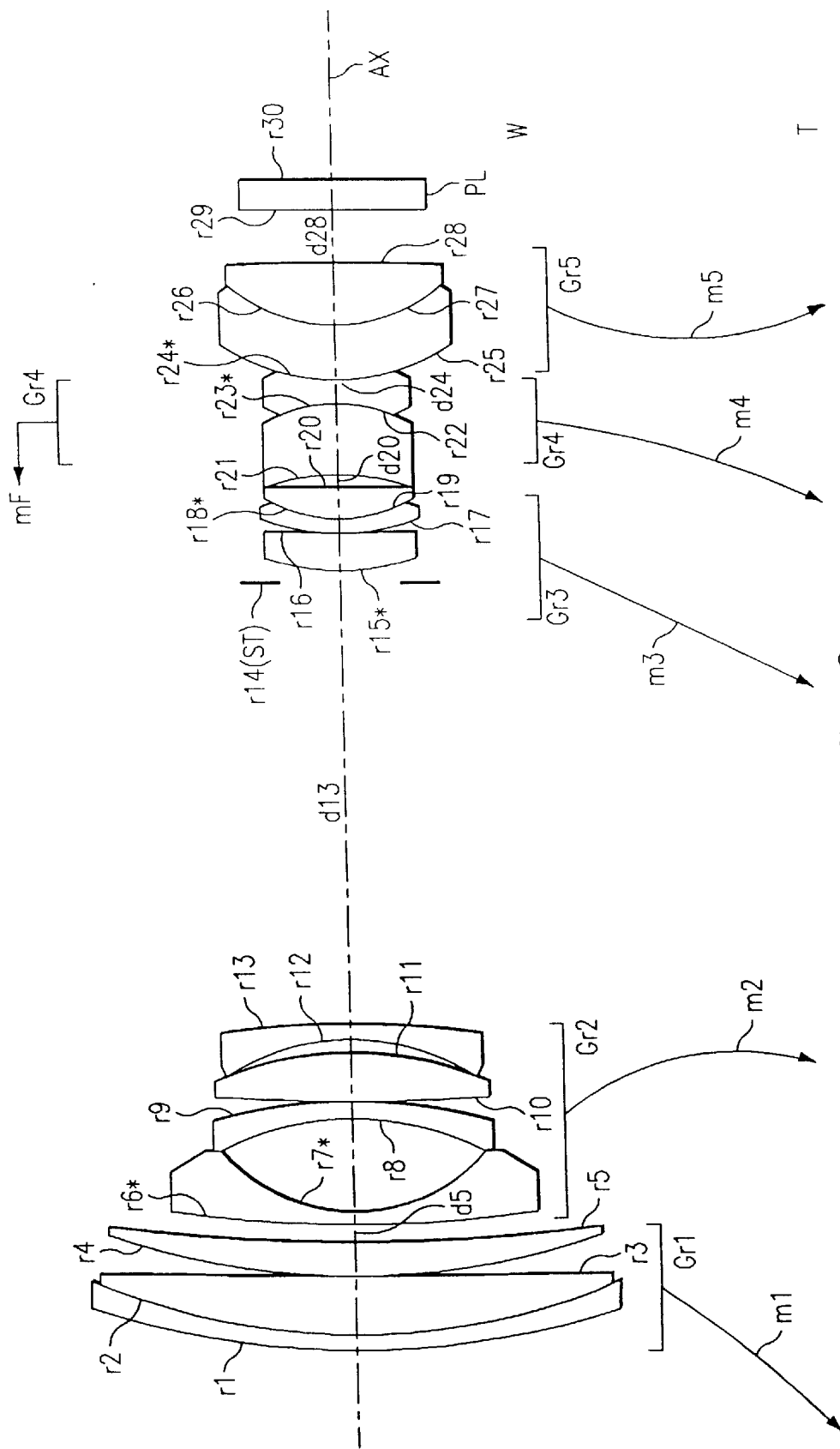
FIG. 6 is a lens arrangement diagram of a sixth embodiment (Example 6) of the invention.
Figure 7:
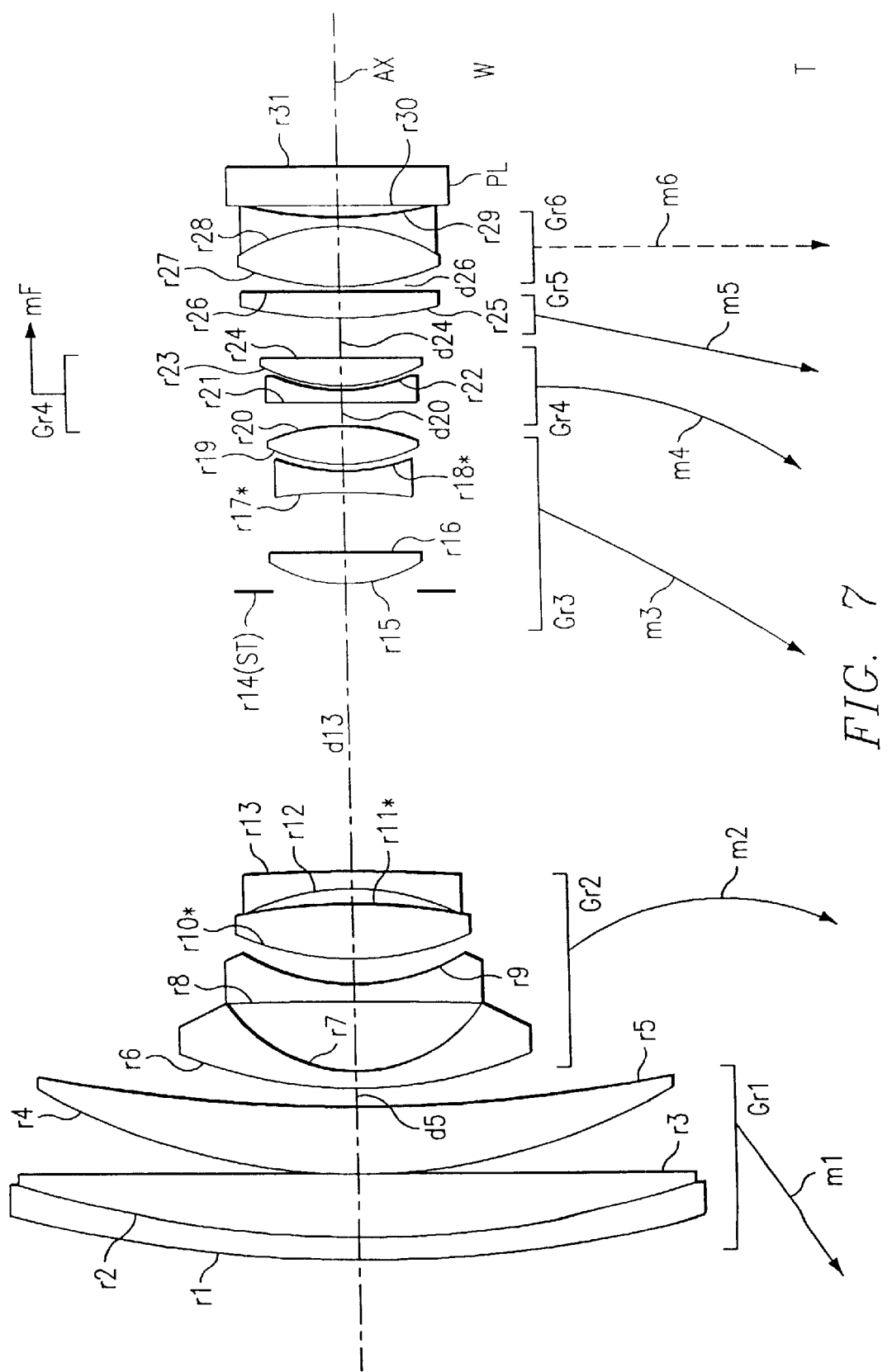
FIG. 7 is a lens arrangement diagram of a seventh embodiment (Example 7) of the invention.
Figure 8:
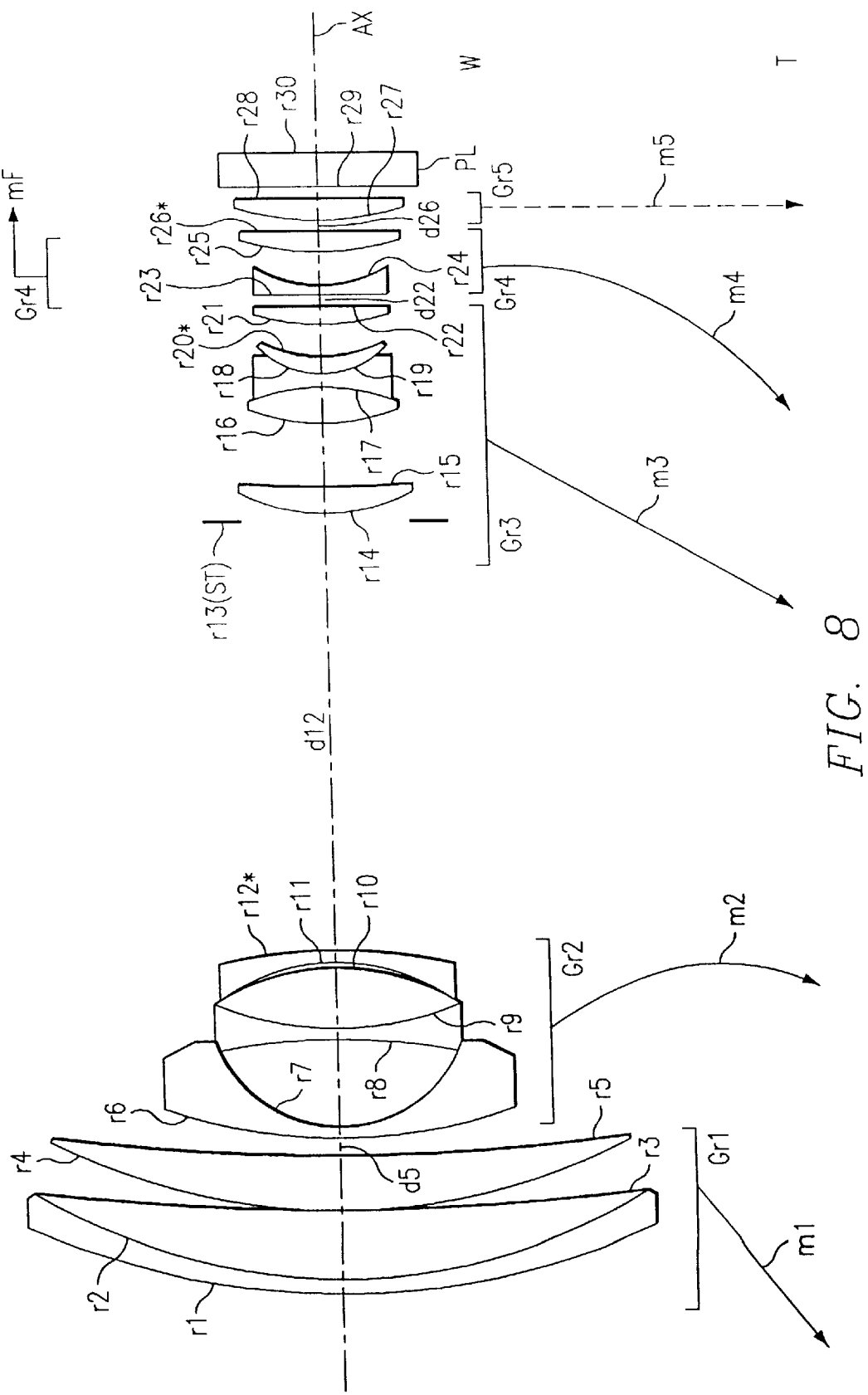
FIG. 8 is a lens arrangement diagram of an eighth embodiment (Example 8) of the invention.
Figure 9:
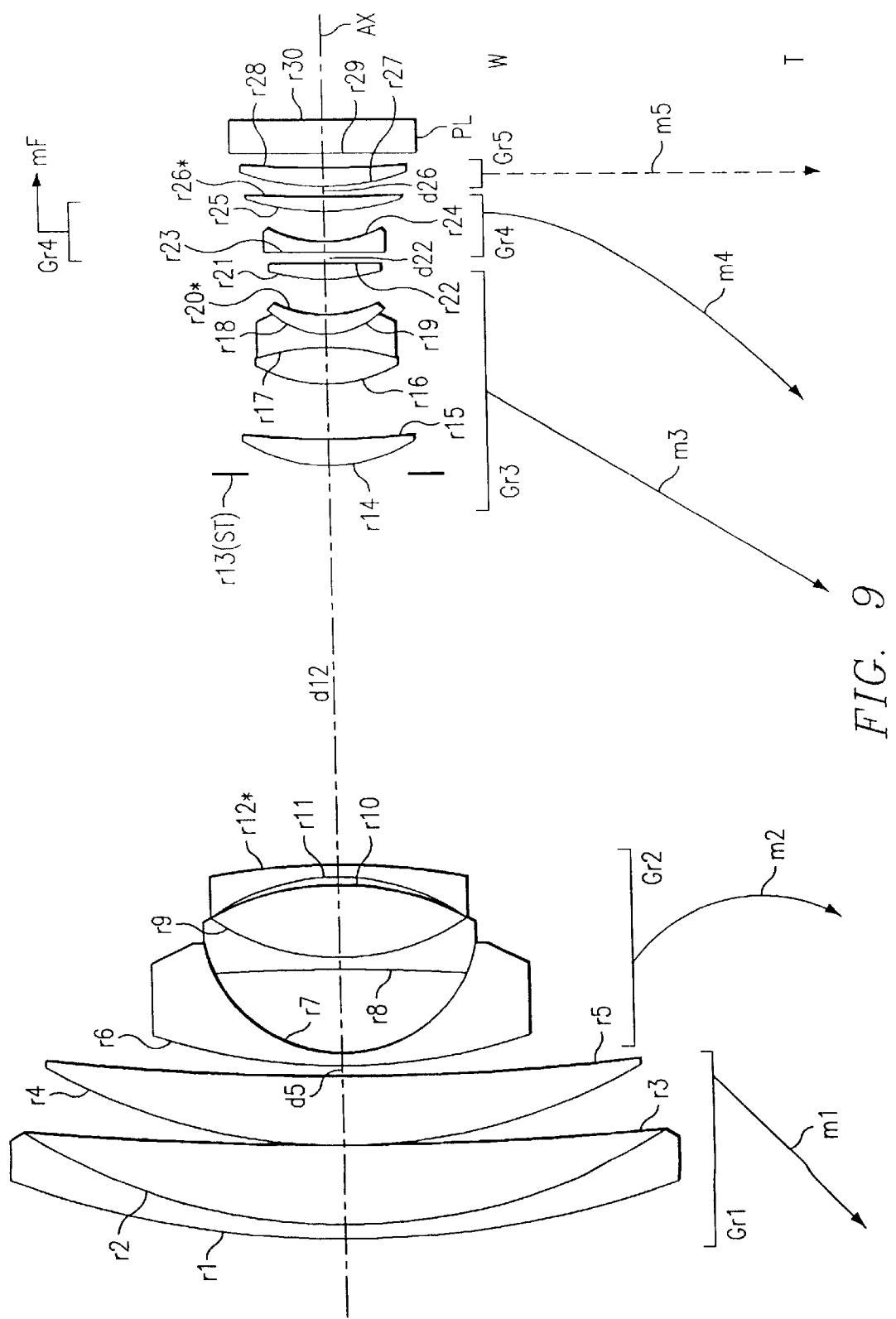
FIG. 9 is a lens arrangement diagram of a ninth embodiment (Example 9) of the invention.
Figure 10A:
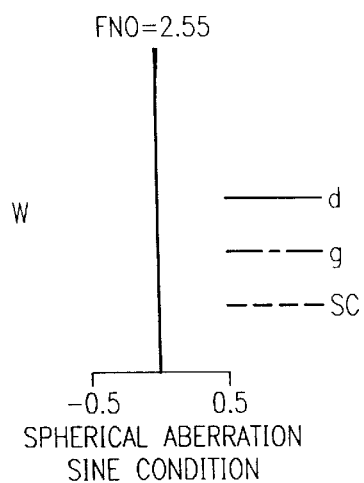
FIGS. 10A to 10I are aberration diagrams of Example 1, as observed when focused at infinity.
Figure 10B:
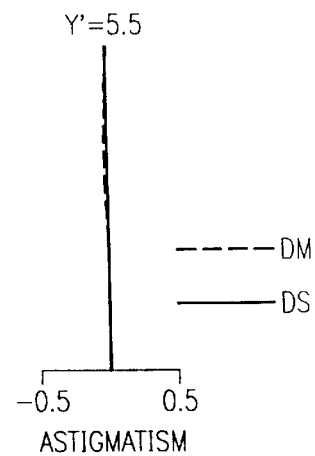
Figure 10C:
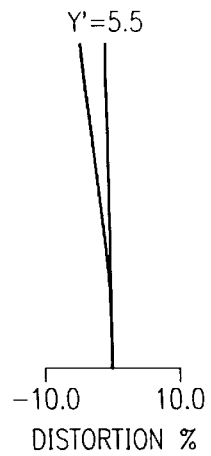
Figure 10D:
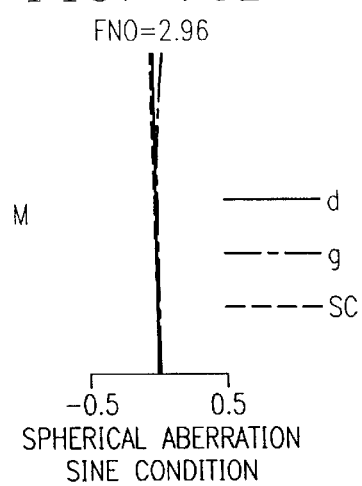
Figure 10E:
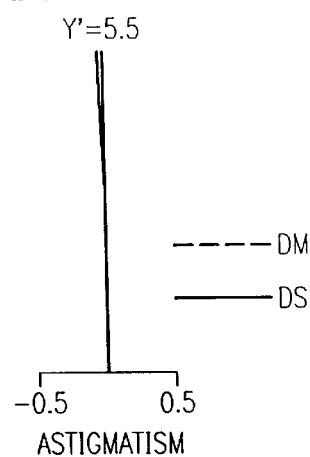
Figure 10F:
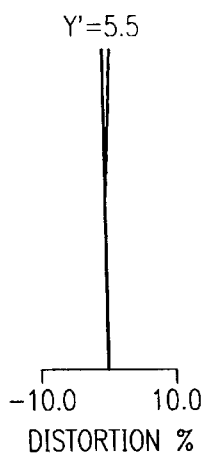
Figure 10G:
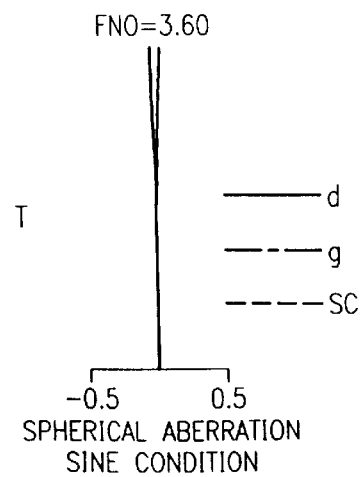
Figure 10H:
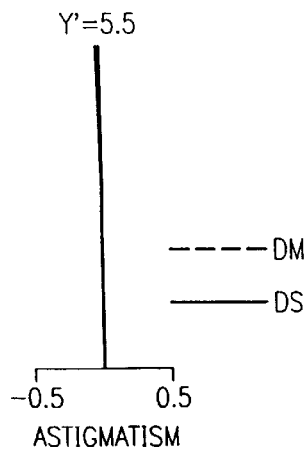
Figure 10I:
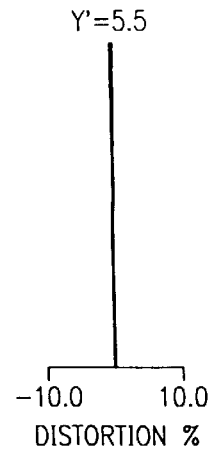
Figure 11A:
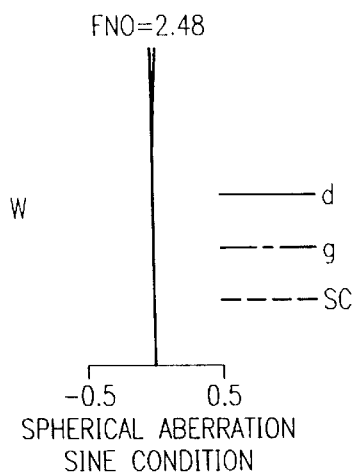
FIGS. 11A to 11I are aberration diagrams of Example 2, as observed when focused at infinity.
Figure 11B:
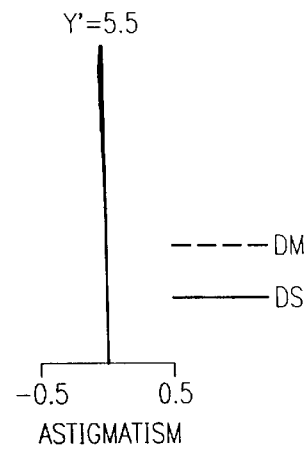
Figure 11C:
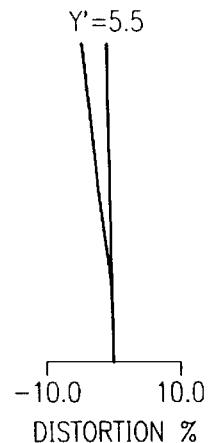
Figure 11D:
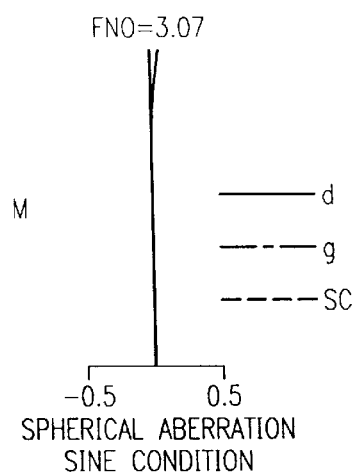
Figure 11E:
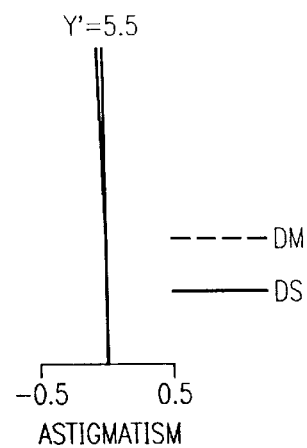
Figure 11F:
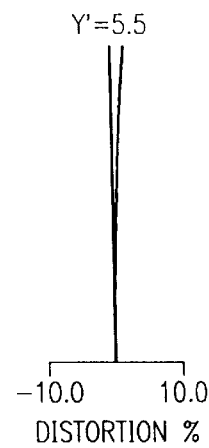
Figure 11G:
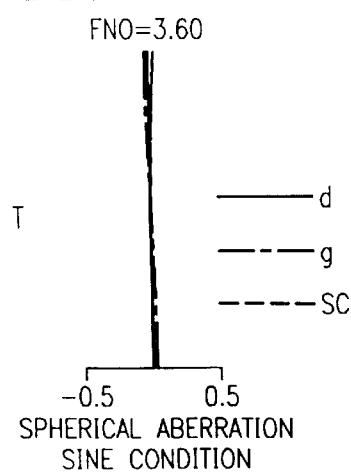
Figure 11H:
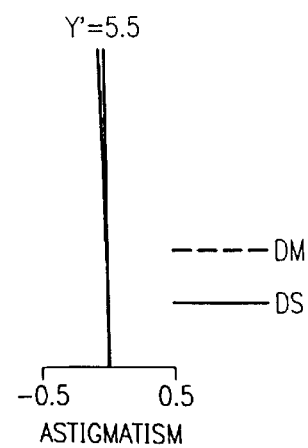
Figure 11I:
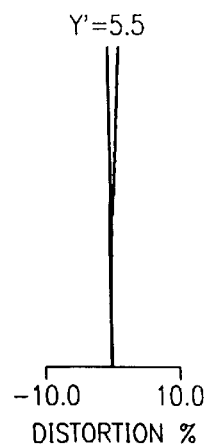
Figure 12A:
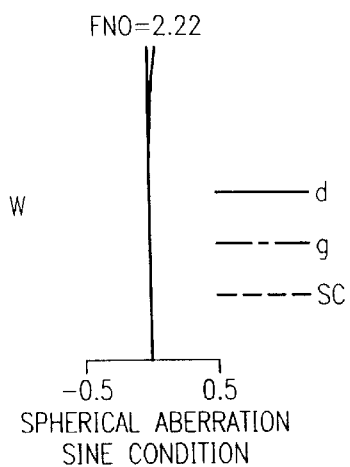
FIGS. 12A to 12I are aberration diagrams of Example 3, as observed when focused at infinity.
Figure 12B:
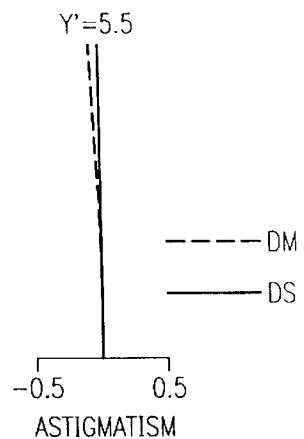
Figure 12C:
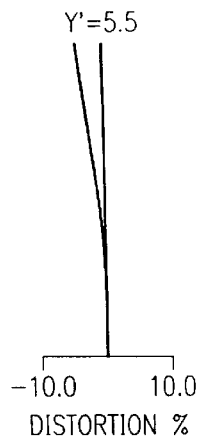
Figure 12D:
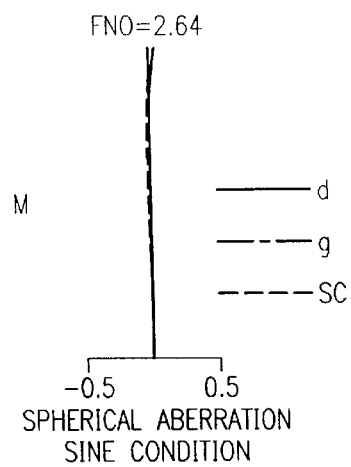
Figure 12E:
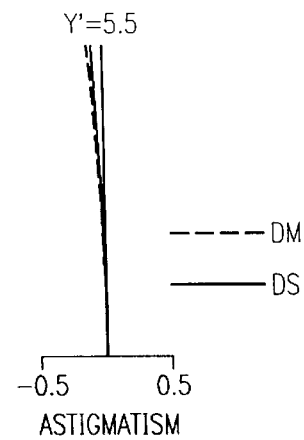
Figure 12F:
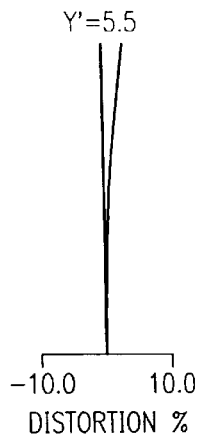
Figure 12G:
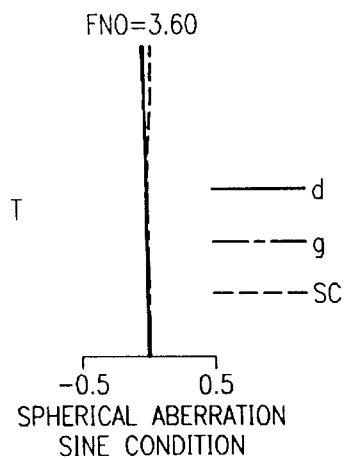
Figure 12H:
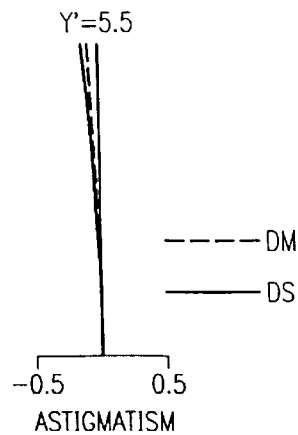
Figure 12I:
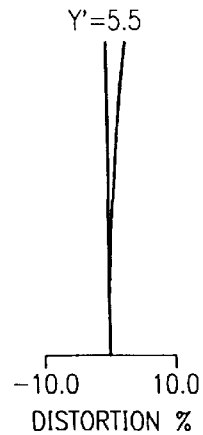
Figure 13A:
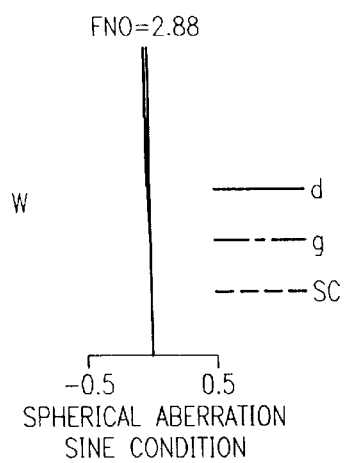
FIGS. 13A to 13I are aberration diagrams of Example 4, as observed when focused at infinity.
Figure 13B:
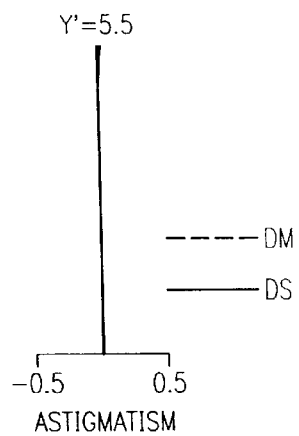
Figure 13C:
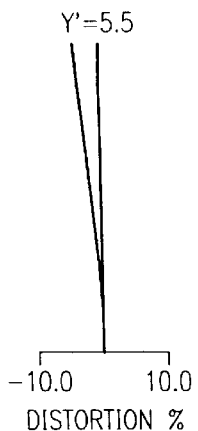
Figure 13D:
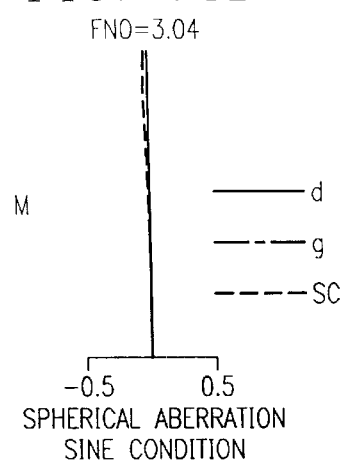
Figure 13E:
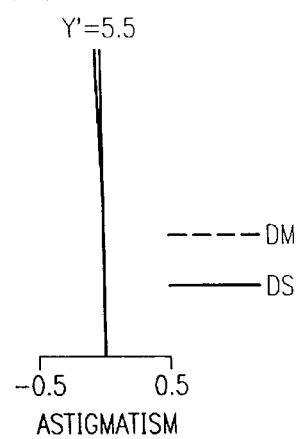
Figure 13F:
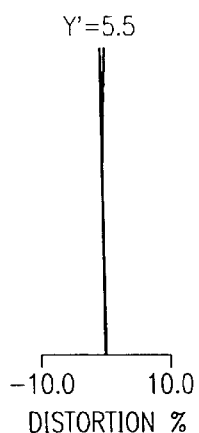
Figure 13G:
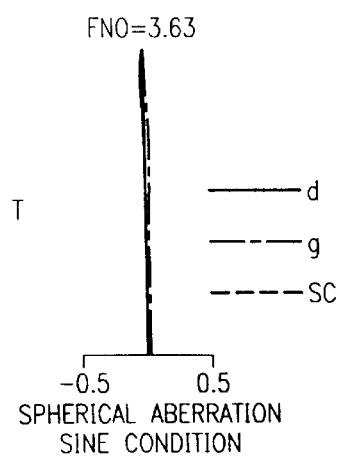
Figure 13H:
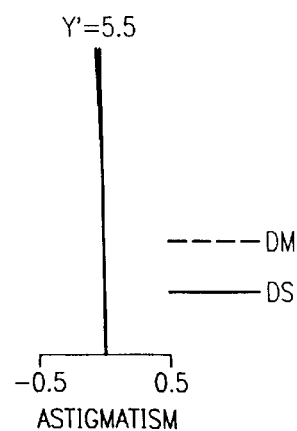
Figure 13I:
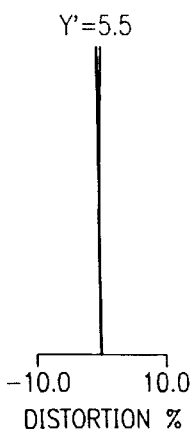
Figure 14A:
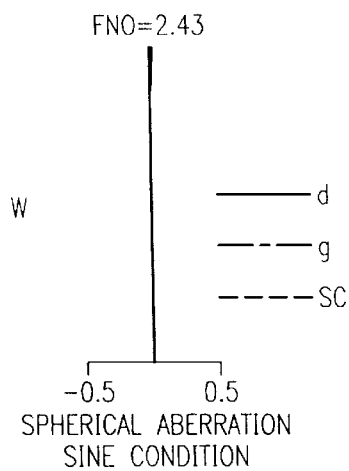
FIGS. 14A to 14I are aberration diagrams of Example 5, as observed when focused at infinity.
Figure 14B:
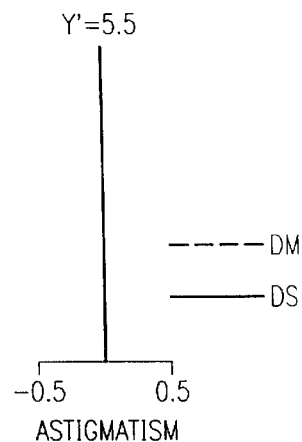
Figure 14C:
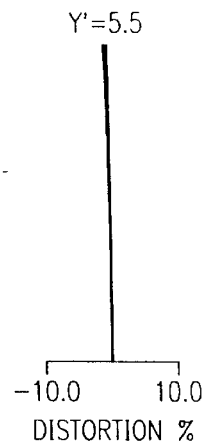
Figure 14D:
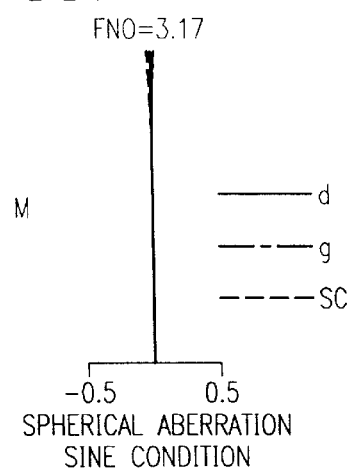
Figure 14E:
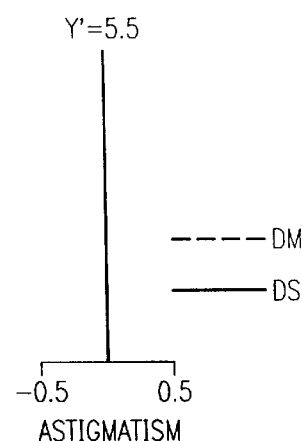
Figure 14F:
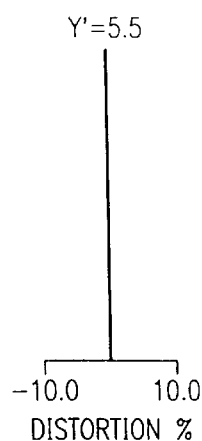
Figure 14G:
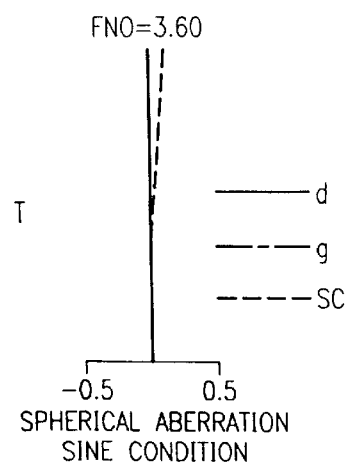
Figure 14H:
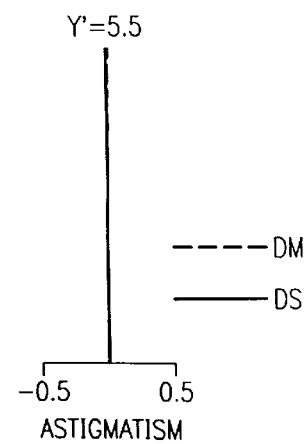
Figure 14I:
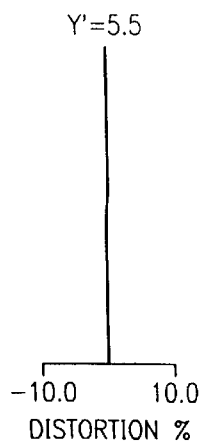
Figure 15A:
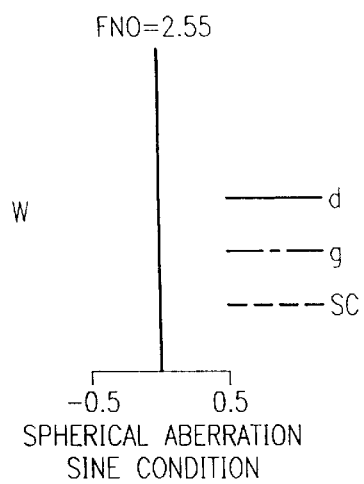
FIGS. 15A to 15I are aberration diagrams of Example 6, as observed when focused at infinity.
Figure 15B:
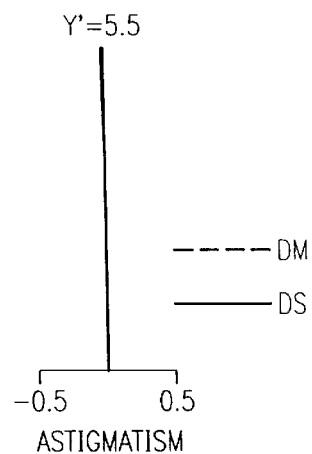
Figure 15C:
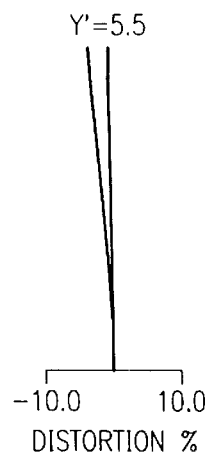
Figure 15D:
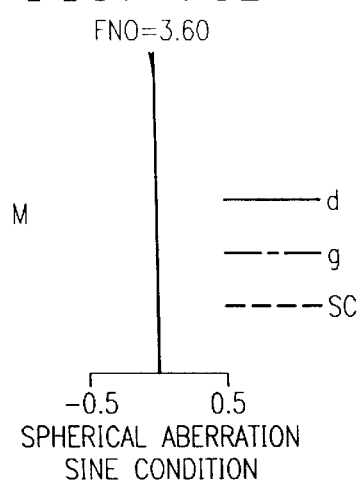
Figure 15E:
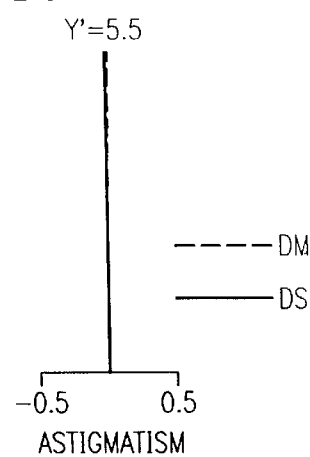
Figure 15F:
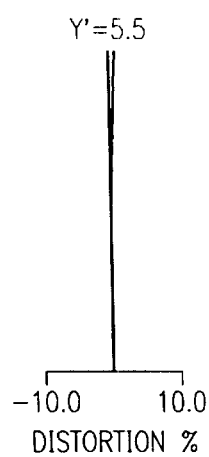
Figure 15G:
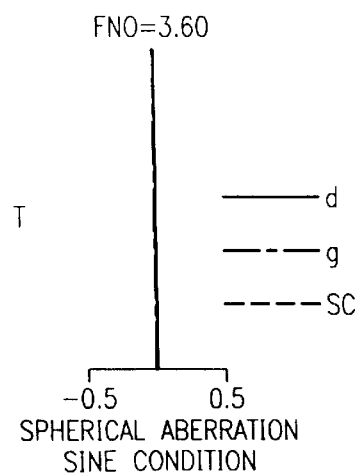
Figure 15H:
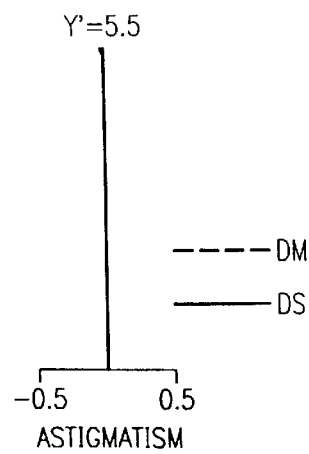
Figure 15I:
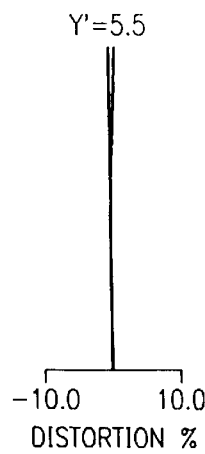
Figure 17A:
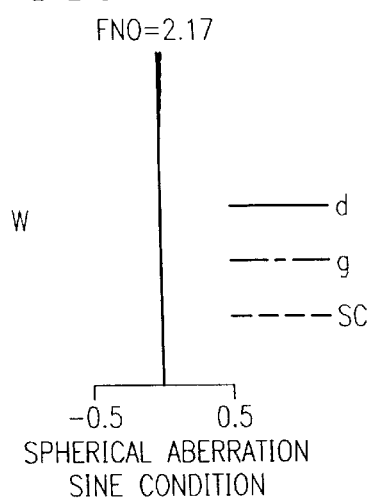
FIGS. 17A to 17I are aberration diagrams of Example 8, as observed when focused at infinity.
Figure 17B:
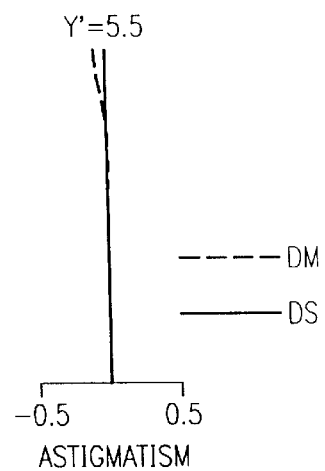
Figure 17C:
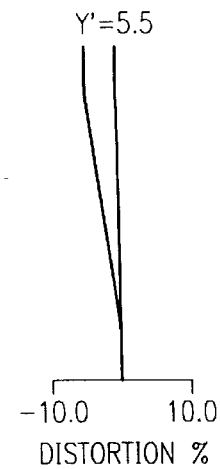
Figure 17D:
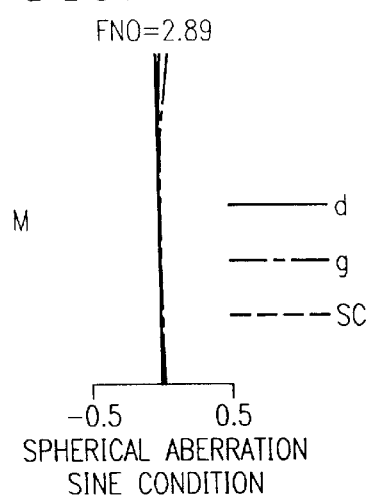
Figure 17E:
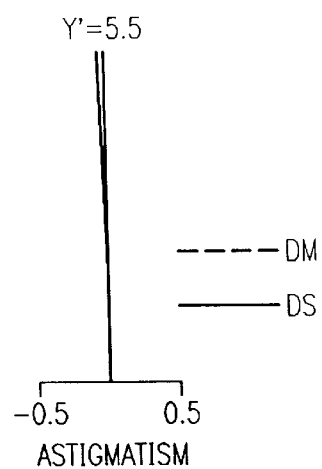
Figure 17F:
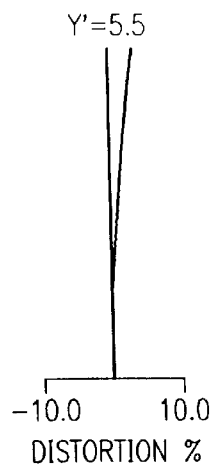
Figure 17G:
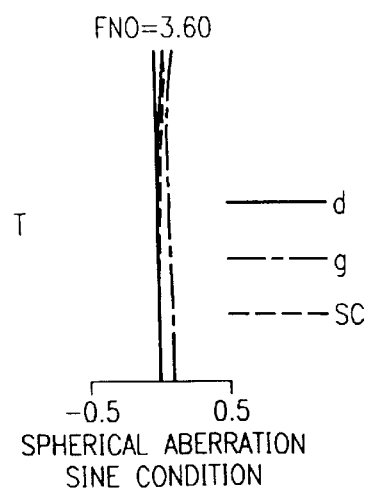
Figure 17H:
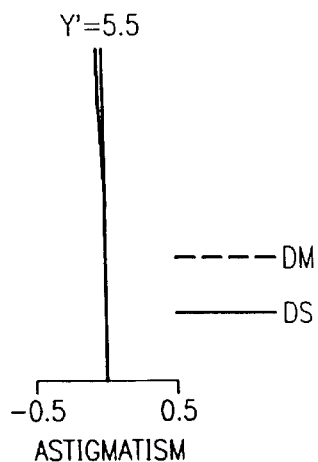
Figure 17I:
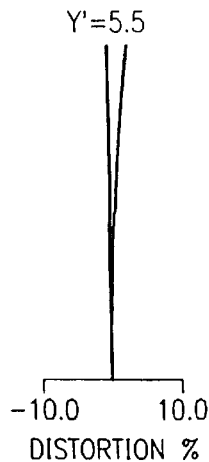
Figure 18A:
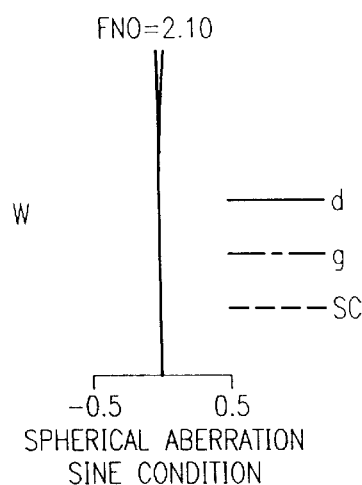
FIGS. 18A to 18I are aberration diagrams of Example 9, as observed when focused at infinity.
Figure 18B:
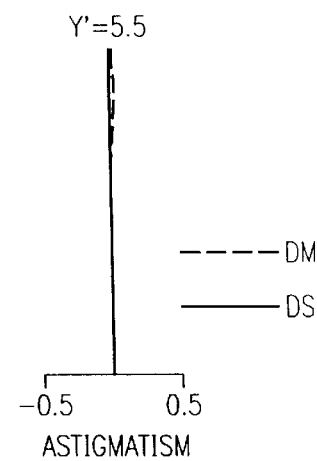
Figure 18C:
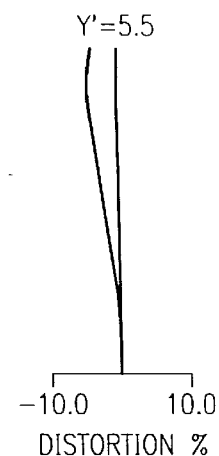
Figure 18D:
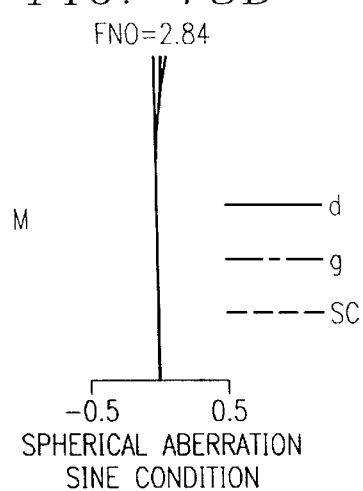
Figure 18E:
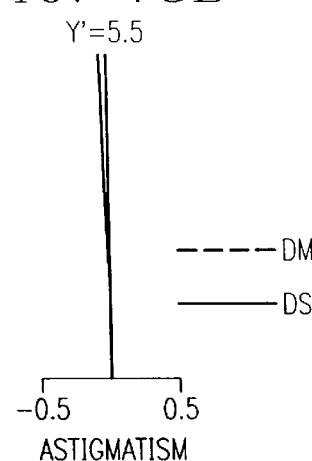
Figure 18F:
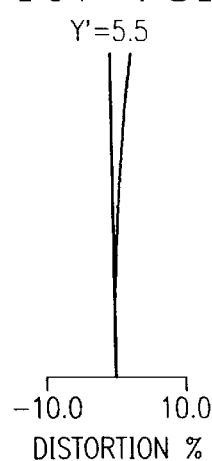
Figure 18G:
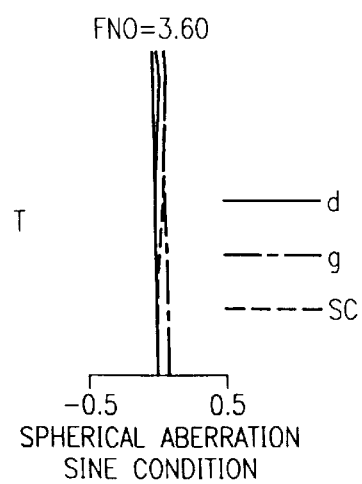
Figure 18H:
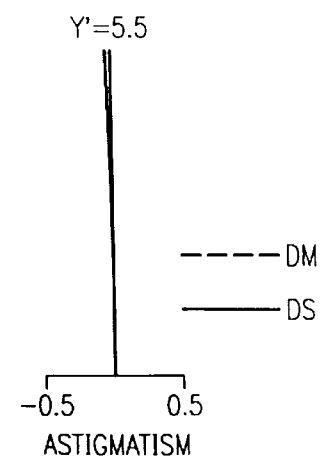
Figure 18I:
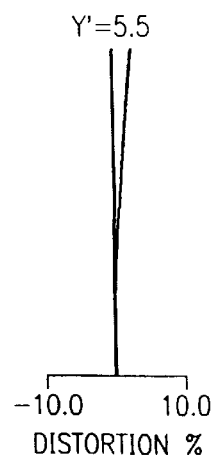
Figure 20D:
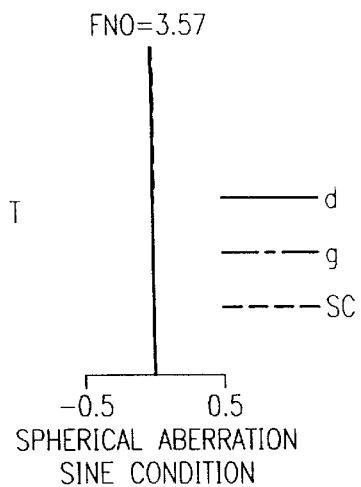
Figure 20E:
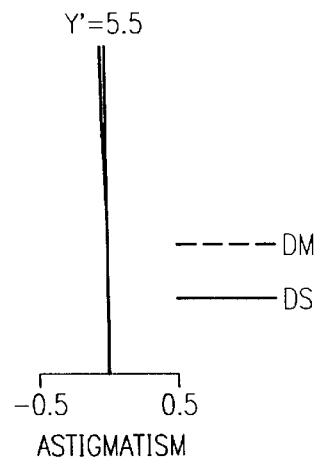
Figure 20F:
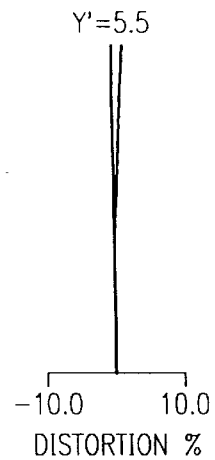
Figure 21A:
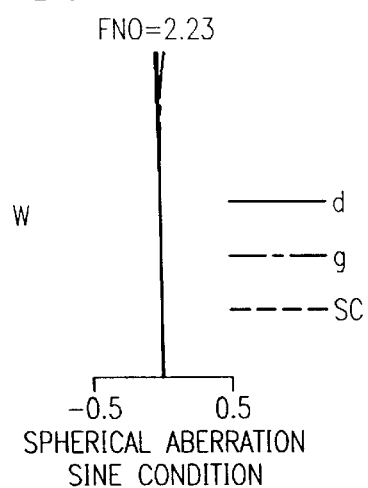
FIGS. 21A to 21F are aberration diagrams of Example 3, as observed when focused at a close-up distance (D=0.5 m)
Figure 21B:
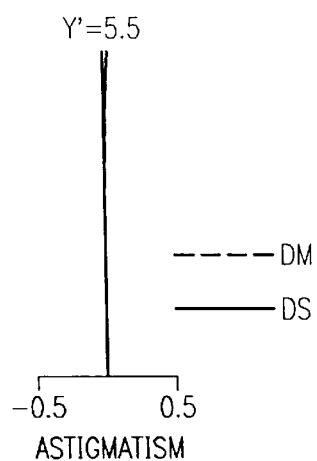
Figure 21C:
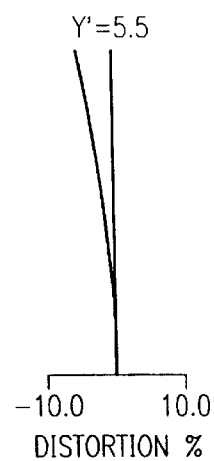
Figure 21D:
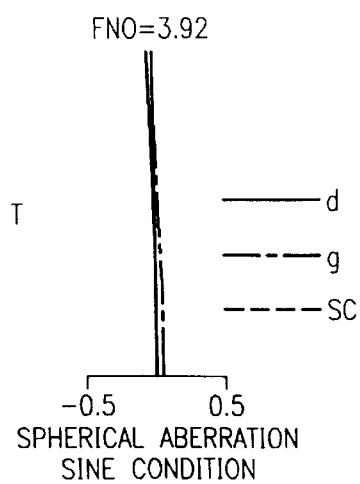
Figure 21E:
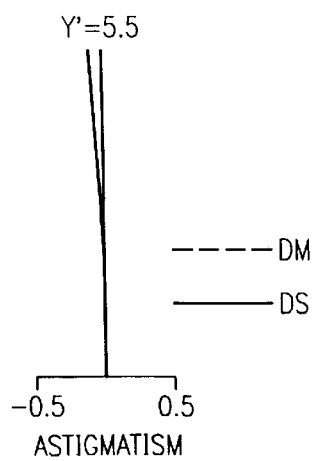
Figure 21F:
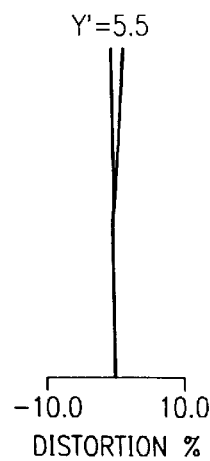
Figure 22A:
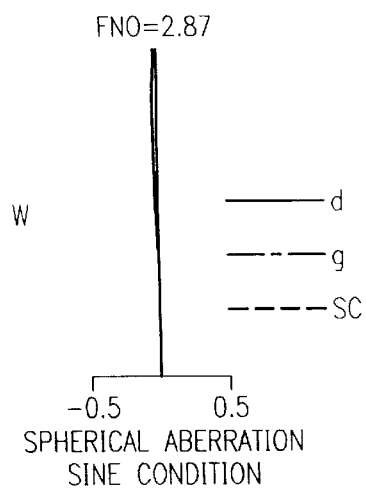
FIGS. 22A to 22F are aberration diagrams of Example 4, as observed when focused at a close-up distance (D=0.5 m)
Figure 22B:
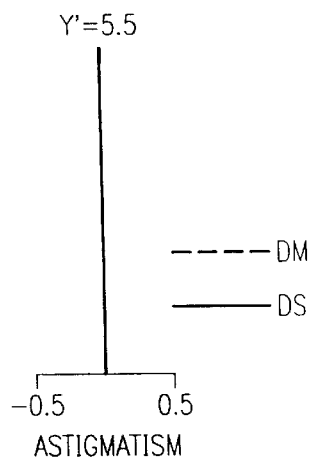
Figure 22C:
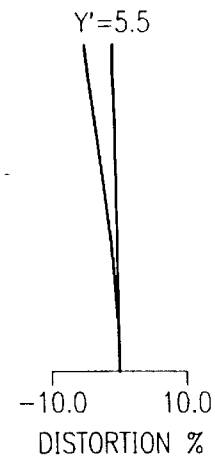
Figure 22D:
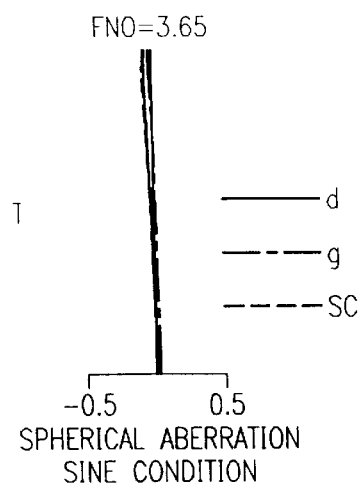
Figure 22E:
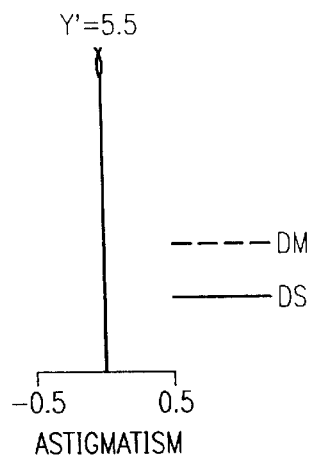
Figure 22F:
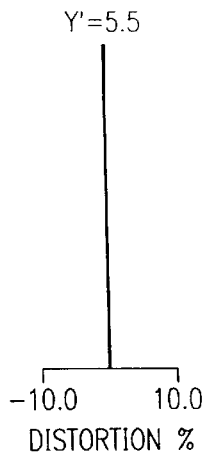
Figure 23A:
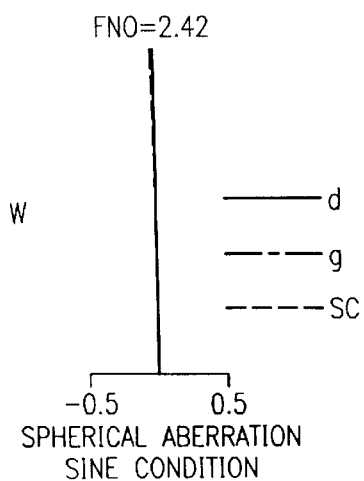
FIGS. 23A to 23F are aberration diagrams of Example 5, as observed when focused at a close-up distance (D=0.5 m)
Figure 23B:
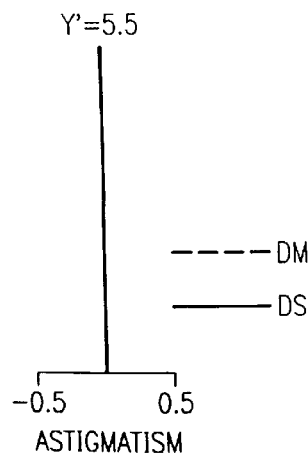
Figure 23C:
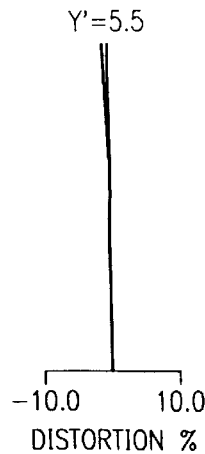
Figure 23D:
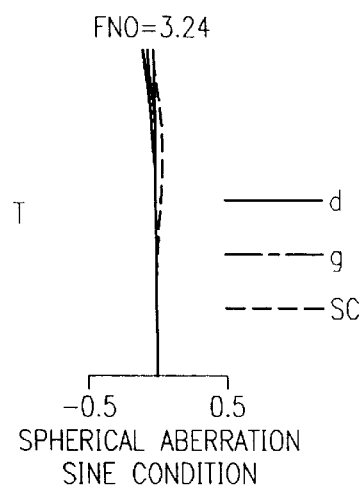
Figure 23E:
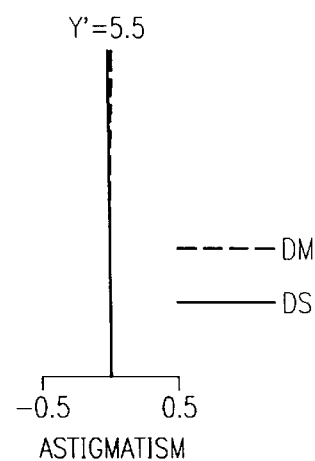
Figure 23F:
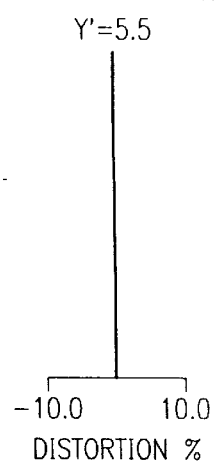
Figure 24A:
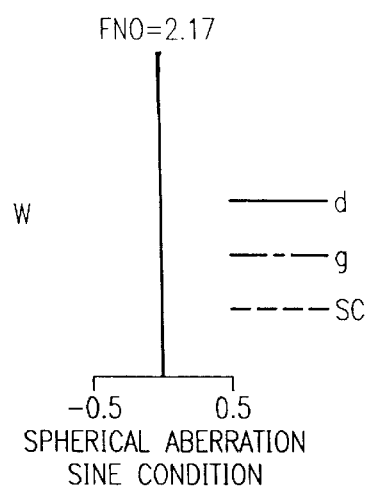
FIGS. 24A to 24F are aberration diagrams of Example 8, as observed when focused at a close-up distance (D=0.5 m)
Figure 24B:
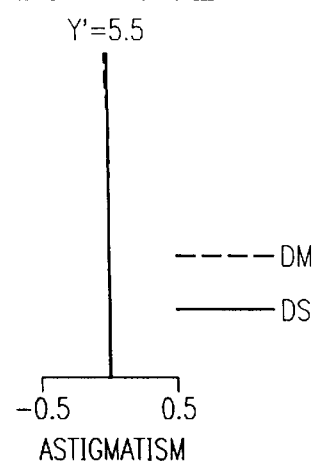
Figure 24C:
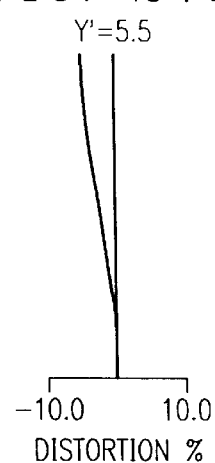
Figure 24D:
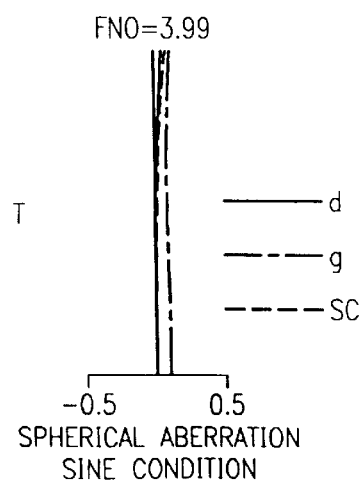
Figure 24E:
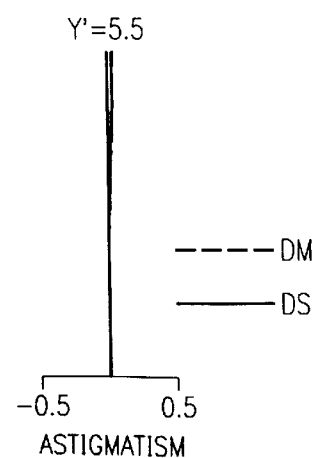
Figure 24F:
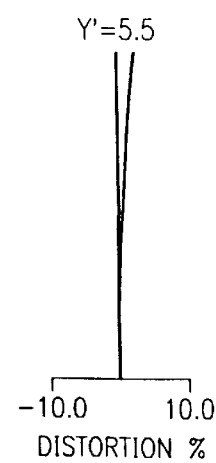
Figure 25A:
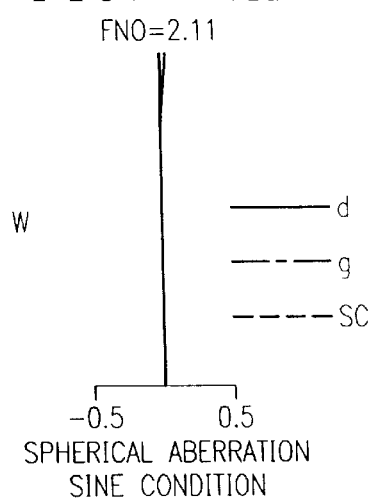
FIGS. 25A to 25F are aberration diagrams of Example 9, as observed when focused at a close-up distance (D=0.5 m)
Figure 25B:
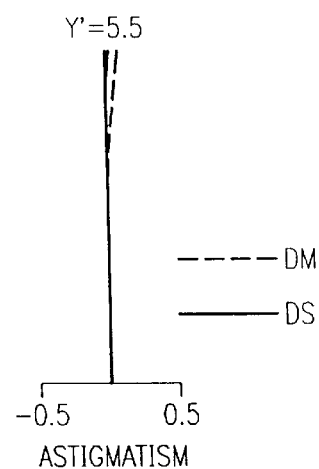
Figure 25C:
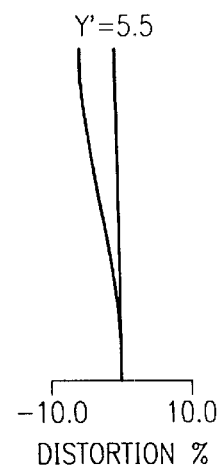
Figure 25D:
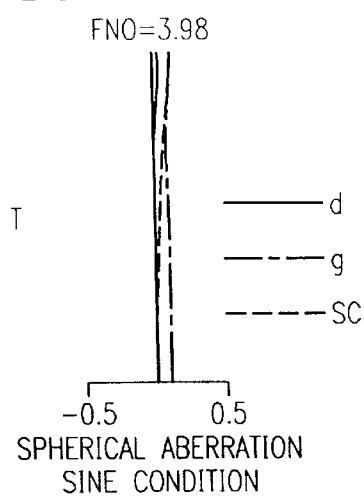
Figure 25E:
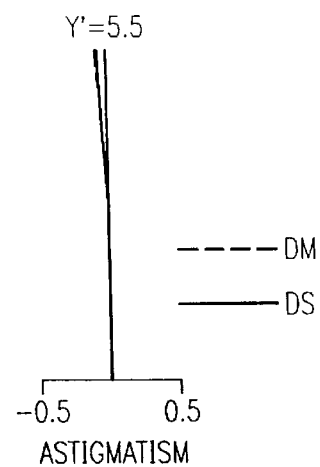
Figure 25F:
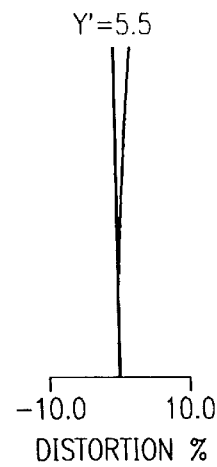
Figure 26:
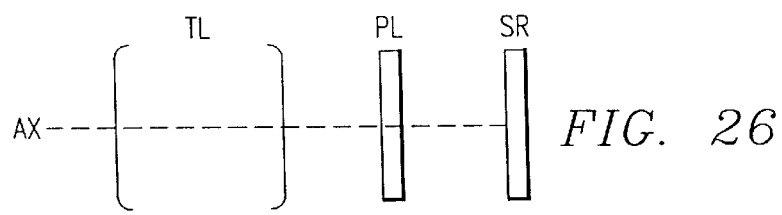
FIG. 26 is a diagram schematically illustrating the outline of the optical construction of a taking lens device embodying the invention.
Figure 27:
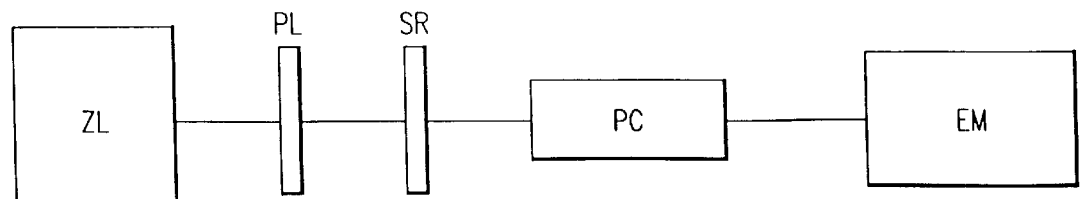
FIG. 27 is a diagram schematically illustrating the outline of a construction of an embodiment of the invention that could be used in a digital camera.

Hereinafter, optical or taking lens devices embodying the present invention will be described with reference to the drawings and optical or taking lens devices will be referred to as taking lens devices. A taking lens device optically takes in an image of a subject and then outputs the image as an electrical signal. A taking lens device is used as a main component of a camera used to shoot a still or moving pictures of a subject, for example a digital still camera, a digital video camera, or a camera that is incorporated in or externally fitted to a device such as a digital video unit, a personal computer, a mobile computer, a portable telephone, or a personal digital assistant (PDA). A digital camera also includes a memory to store the image data from the image sensor. The memory may be removable, for example, a disk, or the memory may be permanently installed in the camera. FIG. 26 shows a taking lens device comprised of, from the object (subject) side, a taking lens system (TL) that forms an optical image of an object, a plane-parallel plate (PL) that functions as an optical low-pass filter or the like, and an image sensor (SR) that converts the optical image formed by the taking lens system (TL) into an electrical signal. FIG. 27 shows a zoom lens system ZL, an optical low-pass filter PL, an image sensor SR, processing circuits PC that would include any electronics needed to process the image, and a memory EM that could be used in a digital camera.

In all of the embodiments described hereinafter, the taking lens system TL is built as a zoom lens system comprised of a plurality of lens units wherein zooming is achieved by moving two or more lens units along the optical axis AX in such a way that their unit-to-unit distances vary. The image sensor SR is realized, for example, with a solid-state image sensor such as a CCD (charge-coupled device) or CMOS (complementary metal-oxide semiconductor) sensor having a plurality of pixels, and, by this image sensor SR, the optical image formed by the zoom lens system is converted into an electrical signal. The optical image to be formed by the zoom lens system has its spatial frequency characteristics adjusted by being passed through the low-pass filter PL that has predetermined cut-off frequency characteristics that are determined by the pixel pitch of the image sensor SR. This helps minimize so-called aliasing noise that appears when the optical image is converted into an electrical signal. The signal produced by the image sensor SR is subjected, as required, to predetermined digital image processing, image compression, and other processing, and is then, as a digital image signal, recorded in a memory (such as a semiconductor memory or an optical disk) or, if required, transmitted to another device by way of a cable or after being converted into an infrared signal.

FIGS. 1 to 9 are lens arrangement diagrams of the zoom lens system used in a first to a ninth embodiment of the present invention, each showing the lens arrangement at the wide-angle end W in an optical sectional view. In each lens arrangement diagram, an arrow mj (j=1, 2, . . . ) schematically indicates the movement of the j-th lens unit Grj during zooming from the wide-angle end W to the telephoto end T (a broken-line arrow mj, however, indicates that the corresponding lens unit is kept stationary during zooming), and an arrow mF indicates the direction in which the focusing unit is moved during focusing from infinity to a close-up distance. Moreover, in each lens arrangement diagram, ri (i=1, 2, 3, . . . ) indicates the i-th surface from the object (subject) side, and a surface ri marked with an asterisk (*) is an aspherical surface. Di (i=1, 2, 3, . . . ) indicates the i-th axial distance from the object side, though only those which vary with zooming, called variable distances, are shown here.

In all of the embodiments, the zoom lens system includes, from the object side, a first lens unit Gr1 having a positive optical power, a second lens unit Gr2 having a negative optical power, a third lens unit Gr3 having a positive optical power, and a fourth lens unit Gr4 having a negative optical power. In addition, designed for a camera (for example, a digital camera) provided with a solid-state image sensor (for example, a CCD), the zoom lens system also has a flat glass plate PL, which is a glass plane-parallel plate that functions as an optical low-pass filter or the like, disposed on the image-plane side thereof. In all of the embodiments, the flat glass plate PL is kept stationary during zooming, and the third lens unit Gr3 includes an aperture stop ST at the object-side end thereof.

In the first embodiment, the zoom lens system is a four-unit zoom lens of a positive-negative-positive-negative configuration, and is comprised of, from the object side, a first lens unit Gr1 having a positive optical power, a second lens unit Gr2 having a negative optical power, a third lens unit Gr3 having a positive optical power, and a fourth lens unit Gr4 having a negative optical power. In the second to the fourth, the sixth, the eighth, and the ninth embodiments, the zoom lens system is a five-unit zoom lens of a positive-negative-positive-negative-positive configuration, and is comprised of, from the object side, a first lens unit Gr1 having a positive optical power, a second lens unit Gr2 having a negative optical power, a third lens unit Gr3 having a positive optical power, a fourth lens unit Gr4 having a negative optical power, and a fifth lens unit Gr5 having a positive optical power.

In the fifth embodiment, the zoom lens system is a six-unit zoom lens of a positive-negative-positive-negative-positive-negative configuration, and is comprised of, from the object side, a first lens unit Gr1 having a positive optical power, a second lens unit Gr2 having a negative optical power, a third lens unit Gr3 having a positive optical power, a fourth lens unit Gr4 having a negative optical power, a fifth lens unit Gr5 having a positive optical power, and a sixth lens unit Gr6 having a negative optical power. In the seventh embodiment, the zoom lens system is a six-unit zoom lens of a positive-negative-positive-negative-positive-positive configuration, and is comprised of, from the object side, a first lens unit Gr1 having a positive optical power, a second lens unit Gr2 having a negative optical power, a third lens unit Gr3 having a positive optical power, a fourth lens unit Gr4 having a negative optical power, a fifth lens unit Gr5 having a positive optical power, and a sixth lens unit Gr6 having a positive optical power.

In all of the embodiments, the zoom lens system has a configuration starting with a positive-negative-positive-negative sequence. As compared with a configuration starting with a positive-negative-positive-positive sequence, in which both the third lens unit and the fourth lens unit Gr3, Gr4 have positive powers, a configuration starting with a positive-negative-positive-negative sequence, in which the fourth lens unit Gr4 is negative, the opposite signs of the optical powers of the third lens unit and the fourth lens unit Gr3, Gr4 permit a high zoom ratio to be achieved with those lens units Gr3, Gr4 alone, and thus makes it easier to secure a high zoom ratio through the entire zoom lens system. It is to be noted that configurations starting with a positive-negative-positive-negative sequence include the following variations: a four-unit type having a positive-negative-positive-negative configuration, five-unit types respectively having a positive-negative-positive-negative-positive and a positive-negative-positive-negative-negative configuration, six-unit types having a positive-negative-positive-negative-positive-positive, a positive-negative-positive-negative-positive-negative, a positive-negative-positive-negative-negative-positive, and a positive-negative-positive-negative-negative-negative configuration, and so forth.

In a zoom lens system, like those used in the embodiments, of the type that includes, from the object side, positive-negative-positive-negative zoom units, it is preferable that conditional formula (1) below be fulfilled. This makes it possible to realize a compact, high-zoom-ratio zoom lens system. In addition, the thus realized zoom lens system offers a zoom ratio of about 7× to 10×, an f-number of about 2.5 to 4, and high performance that makes the zoom lens system usable as an optical system for use with a leading-edge image sensor SR with a very small pixel pitch.

$$1.1 < f1/fT < 2.5 \tag{1}$$

where f1 represents the focal length of the first lens unit Gr1; and fT represents the focal length of the entirety of the optical system of the zoom lens system at the telephoto end T.

If the lower limit of conditional formula (1) were to be transgressed, the optical power of the first lens unit Gr1 would be too strong, and thus it would be difficult to eliminate spherical aberration, in particular, at the wide-angle end W. By contrast, if the upper limit of conditional formula (1) were to be transgressed, the optical power of the first lens unit Gr1 would be too weak, and thus it would be difficult to achieve satisfactory compactness, in particular, at the telephoto end T.

In a zoom lens system, like those used in the embodiments, of the type that includes, from the object side, positive-negative-positive-negative zoom units, it is preferable that focusing be achieved by moving the fourth lens unit Gr4 along the optical axis AX and that conditional formula (2) below be additionally fulfilled. This makes it possible to realize a zoom lens system offering higher performance. It is further preferable that conditional formula (2) be fulfilled together with conditional formula (1) noted previously.

$$0.3 < |f4/fT| < 2 \tag{2}$$

where f4 represents the focal length of the fourth lens unit Gr4; and fT represents the focal length of the entire optical system at the telephoto end T.

As conditional formula (2) suggests, the fourth lens unit Gr4 has a relatively weak optical power, and accordingly the fourth lens unit Gr4 has the fewest lens elements. Thus, focusing is best achieved by moving (as indicated by the arrow mF) the fourth lens unit Gr4, which is light, along the optical axis AX. However, in cases where it is possible to adopt a system that permits the image sensor SR to be moved for focusing, focusing may be achieved instead by moving the image sensor SR.

If the lower limit of conditional formula (2) were to be transgressed, the optical power of the fourth lens unit Gr4 would be so strong that it would be difficult to eliminate performance degradation at close-up distances, in particular, at the telephoto end T. By contrast, if the upper limit of conditional formula (2) were to be transgressed, the optical power of the fourth lens unit Gr4 would be so weak that the fourth lens unit Gr4 would need to be moved through an unduly long distance for focusing. This would spoil the compactness of the lens barrel structure as a whole.

It is preferable that, as in all the embodiments, as zooming is performed from the wide-angle end W to the telephoto end T, the first lens unit Gr1 be moved and the distance between the third and fourth lens units Gr3, Gr4 increase from the wide-angle end W to the middle-focal-length position and decrease from the middle-focal-length position to the telephoto end T. This makes it possible to realize a high-zoom-ratio zoom lens system. In this distinctive zoom arrangement, it is further preferable that conditional formulae (1) and (2) be fulfilled.

Conventionally, the majority of optical systems used in video cameras or digital cameras are so constructed that their first lens unit Gr1 is kept stationary during zooming, because this construction offers a proper balance between the compactness of the product as a whole and the complexity of lens barrel design. However, considering the current trend toward further compactness and higher zoom ratios, it is preferable to make the first lens unit Gr1 movable. By moving the first lens unit Gr1 toward the object side during zooming from the wide-angle end W to the telephoto end T, it is possible to lower the heights at which rays enter the second lens unit Gr2 at the telephoto end T. This makes aberration correction easier. Moreover, by adopting an arrangement in which, during zooming from the wide-angle end W to the telephoto end T, the distance between the third lens unit and the fourth lens unit Gr3, Gr4 increases from the wide-angle end W to the middle-focal-length position and decreases from the middle-focal-length position to the telephoto end T, it is possible to properly correct the curvature of field that occurs in the middle-focal-length region. This makes it possible to realize a high-zoom-ratio zoom lens system.

It is preferable to dispose, as in all of the embodiments, an aspherical surface in the second lens unit Gr2. Disposing an aspherical surface in the second lens unit Gr2 makes it possible to realize a zoom lens system of which the zoom range starts at a wider angle. An attempt to increase the shooting view angle by reducing the focal length at the wide-angle end W results in making correction of distortion difficult, in particular, at the wide-angle end W. To avoid this inconvenience, it is preferable to dispose an aspherical surface in the second lens unit Gr2 through which off-axial rays pass at relatively great heights on the wide-angle side. This makes proper correction of distortion possible. Thus, to obtain high optical performance without sacrificing compactness, it is further preferable that conditional formulae (1) and (2) be fulfilled and in addition that an aspherical surface be disposed in the second lens unit Gr2.

In a zoom lens system, like those used in the embodiments, of the type that includes, from the object side, positive-negative-positive-negative zoom units and in which the first lens unit Gr1 is moved during zooming, it is preferable that conditional formula (3) below be fulfilled. This makes it possible to realize a compact, high-zoom-ratio zoom lens system. In addition, the thus realized zoom lens system offers a zoom ratio of about 7× to 10×, an f-number of about 2.5 to 4, and high performance that makes the zoom lens system usable as an optical system for use with a leading-edge image sensor SR with a very small pixel pitch.

$$0.3 < D_{34W}/D_{34T} < 2.5 \quad (3)$$

where $D_{34W}$ represents the aerial distance between the third lens unit and the fourth lens unit Gr3, Gr4 at the wide-angle end W; and $D_{34T}$ represents an aerial distance between the third lens unit and the fourth lens unit Gr3, Gr4 at the telephoto end T.

If the lower limit of conditional formula (3) were to be transgressed, the aerial distance between the third lens unit and the fourth lens unit Gr3, Gr4 at the telephoto end T would be so long that it would be difficult to achieve satisfactory compactness at the telephoto end T. By contrast, if the upper limit of conditional formula (3) were to be transgressed, the aerial distance between the third lens unit and the fourth lens unit Gr3, Gr4 at the wide-angle end W is so long that it would be difficult to achieve satisfactory compactness at the wide-angle end W.

In a zoom lens system, like those used in the embodiments, of the type that includes, from the object side, positive-negative-positive-negative zoom units, it is preferable that, during zooming from the wide-angle end W to the telephoto end T, the first lens unit Gr1 be moved as described previously and, in addition, that the fourth lens unit Gr4 be moved toward the object side. This makes it possible to obtain a higher zoom ratio in the fourth lens unit Gr4, and thereby obtain an accordingly higher zoom ratio through the entire zoom lens system. To strike a proper balance between a high zoom ratio and compactness, it is further preferable that conditional formula (3) be fulfilled simultaneously.

In a zoom lens system, like those used in the embodiments, of the type that includes, from the object side, positive-negative-positive-negative zoom units, it is preferable that, as zooming is performed from the wide-angle end W to the telephoto end T, the distance between the third lens unit and the fourth lens unit Gr3, Gr4 increase from the wide-angle end W to the middle-focal-length position and decrease from the middle-focal-length position to the telephoto end T as described previously. To achieve satisfactory compactness, it is further preferable that conditional formula (3) be fulfilled simultaneously. By moving the third lens unit and the fourth lens unit Gr3, Gr4 in this way for zooming, it is possible to properly correct the curvature of field that occurs toward the under side, in particular, in the middle-focal-length region, and thereby realize a zoom lens system that keeps high performance.

In a zoom lens system, like those used in the embodiments, of the type that includes, from the object side, positive-negative-positive-negative zoom units, it is preferable that focusing be achieved by moving the fourth lens unit Gr4, as described previously, and that conditional formula (4) below be additionally fulfilled. This makes it possible to realize a zoom lens system offering higher performance. It is further preferable that conditional formula (4) be fulfilled together with conditional formula (3) noted previously.

$$0.5 < \beta_{W4} < 2 \quad (4)$$

where $\beta_{W4}$ represents the lateral magnification of the fourth lens unit Gr4 at the wide-angle end W.

As described previously, the fourth lens unit Gr4 has a relatively weak optical power, and accordingly the fourth lens unit Gr4 has the fewest lens elements. Thus, the fourth lens unit Gr4, which is light, is best suited for focusing. However, in cases where it is possible to adopt a system that permits focusing using the image sensor SR, focusing may be achieved instead by moving the image sensor SR.

If the lower limit of conditional formula (4) were to be transgressed, the zoom ratio distributed to the fourth lens unit Gr4 would be so low at the wide-angle end W that an unduly high zoom ratio would need to be distributed to the third lens unit Gr3. As a result, it would be difficult to eliminate the aberrations that would occur in the third lens unit Gr3. By contrast, if the upper limit of conditional formula (4) were to be transgressed, the zoom ratio distributed to the fourth lens unit Gr4 would be so high that it would be difficult to eliminate the aberrations that would occur in the fourth lens unit Gr4. As a result, it would be impossible to realize a compact zoom lens system.

As described earlier, disposing an aspherical surface in the second lens unit Gr2 makes it possible to realize a zoom lens system of which the zoom range starts at a wider angle. An attempt to increase the shooting view angle by reducing the focal length at the wide-angle end W results in making correction of distortion difficult, in particular, at the wide-angle end W. To avoid this inconvenience, it is preferable to dispose an aspherical surface in the second lens unit Gr2 through which off-axial rays pass at relatively great heights on the wide-angle side. This makes proper correction of distortion possible. Thus, to obtain high optical performance without sacrificing compactness, it is further preferable that conditional formulae (3) and (4) be fulfilled and in addition that an aspherical surface be disposed in the second lens unit Gr2.

In all of the first to the ninth embodiments, all of the lens units are comprised solely of refractive lenses that deflect light incident thereon by refraction (i.e. lenses of the type that deflects light at the interface between two media having different refractive indices). However, any of these lens units may include, for example, a diffractive lens that deflects light incident thereon by diffraction, a refractive-diffractive hybrid lens that deflects light incident thereon by the combined effects of refraction and diffraction, a gradient-index lens that deflects light incident thereon with varying refractive indices distributed in a medium, or a lens of any other type.

In any of the embodiments, a surface having no optical power (for example, a reflective, refractive, or diffractive surface) may be disposed in the optical path so that the optical path is bent before, after, or in the middle of the zoom lens system. Where to bend the optical path may be determined to suit particular needs. By bending the optical path appropriately, it is possible to make a camera slimmer. It is even possible to build an arrangement in which zooming or the collapsing movement of a lens barrel does not cause any change in the thickness of a camera. For example, by keeping the first lens unit Gr1 stationary during zooming, and disposing a mirror behind the first lens unit Gr1 so that the optical path is bent by 90° by the reflecting surface of the mirror, it is possible to keep the front-to-rear length of the zoom lens system constant and thereby make the camera slimmer.

In all of the embodiments, an optical low-pass filter having the shape of a plane-parallel plate PL is disposed between the last surface of the zoom lens system and the image sensor SR. However, as this low-pass filter, it is also possible to use a birefringence-type low-pass filter made of quartz or the like having its crystal axis aligned with a predetermined direction, a phase-type low-pass filter that achieves the required optical cut-off frequency characteristics by exploiting diffraction, or a low-pass filter of any other type.

Practical Examples

Hereinafter, practical examples of the construction of the zoom lens system used in taking lens devices embodying the present invention will be presented in more detail with reference to their construction data, aberration diagrams, and other data. Examples 1 to 9 presented below correspond to the first embodiment to the ninth embodiment, respectively, as described hereinbefore, and the lens arrangement diagrams (FIGS. 1 to 9) showing the lens arrangement of the first to ninth embodiments apply also to Examples 1 to 9, respectively.

Tables 1 to 9 list the construction data of Examples 1 to 9, respectively. In the construction data of each example, ri (i=1, 2, 3, . . . ) represents the radius of curvature (mm) of the i-th surface from the object side, di (i=1, 2, 3, . . . ) represents the i-th axial distance (mm) from the object side, and Ni (i=1, 2, 3, . . . ) and vi (i=1, 2, 3, . . . ) represent the refractive index Nd for the d-line and the Abbe number (vd) of the i-th optical element from the object side, respectively. Moreover, in the construction data, for each of those axial distances that vary with zooming (i.e., variable aerial distances), three values are given that are, from left, the axial distance at the wide-angle end W (the shortest-focal-length end), the axial distance in the middle position M (the middle-focal-length position), and the axial distance at the telephoto end T (the longest-focal-length end). Also listed are the focal length F (in mm) and the f-number FNO of the entire optical system in those three focal-length positions W, M, and T. Table 10 lists the movement distance (focusing data) of the fourth lens unit Gr4 when focusing at a close-up distance (shooting distance: D=0.5 m), and Table 11 lists the values of the conditional formulae, both as actually observed in Examples 1 to 9.

A surface whose radius of curvature ri is marked with an asterisk (*) is an aspherical surface, of which the surface shape is defined by formula (AS) below. The aspherical surface data of Examples 1 to 9 are also listed in their respective construction data.

$$X(H)=(C0 \cdot H^2)/(1+\sqrt{1-\epsilon \cdot C0^2 \cdot H^2})$$
$$+(A4 \cdot H^4+A6 \cdot H^6+A8 \cdot H^8+A10 \cdot H^{10}) \quad \text{(AS)}$$

where

X(H) represents the displacement along the optical axis at the height H (relative to the vertex);

H represents the height in a direction perpendicular to the optical axis;

C0 represents the paraxial curvature (the reciprocal of the radius of curvature);

$\epsilon$ represents the quadric surface parameter; and

Ai represents the aspherical surface coefficient of i-th order.

FIGS. 10A–10I, 11A–11I, 12A–12I, 13A–13I, 14A–14I, 15A–15I, 16A–16I, 17A–17I, and 18A–18I are diagrams showing the aberration observed in Examples 1 to 9, respectively, when focused at infinity. FIGS. 19A–19F, 20A–20F, 21A–21F, 22A–22F, 23A–23F, 24A–24F, and 25A–25F are diagrams showing the aberration observed in Examples 1 to 5, 8, and 9, respectively, when focused at a close-up distance (shooting distance: D=0.5 m). Of these diagrams, FIGS. 10A–10C, 11A–11C, 12A–12C, 13A–13C, 14A–14C, 15A–15C, 16A–16C, 17A–17C, 18A–18C, 19A–19C, 20A–20C, 21A–21C, 22A–22C, 23A–23C, 24A–24C, and 25A–25C show the aberration observed at the wide-angle end W, FIGS. 10D–10F, 11D–11F, 12D–12F, 13D–13F, 14D–14F, 15D–15F, 16D–16F, 17D–17F, and 18D–18F show the aberration observed in the middle position M, and 10G–10I, 11G–11I, 12G–12I, 13G–13I, 14G–14I, 15G–15I, 16G–16I, 17G–17I, 18G–18I, 19D–19F, 20D–20F, 21D–21F, 22D–22F, 23D–23F, 24D–24F, and 25D–25F show the aberration observed at the telephoto end T. Of these diagrams, FIGS. 10A, 10D, 10G, 11A, 11D, 11G, 12A, 12D, 12G, 13A, 13D, 13G, 14A, 14D, 14G, 15A, 15D, 15G, 16A, 16D, 16G, 17A, 17D, 17G, 18A, 18D, 18G, 19A, 19D, 20A, 20D, 21A, 21D, 22A, 22D, 23A, 23D, 24A, 24D, 25A, and 25D show spherical aberration, FIGS. 10B, 10E, 10H, 11B, 11E, 11H, 12B, 12E, 12H, 13B, 13E, 13H, 14B, 14E, 14H, 15B, 15E, 15H, 16B, 16E, 16H, 17B, 17E, 17H, 18B, 18E, 18H, 19B, 19E, 20B, 20E, 21B, 21E, 22B, 22E, 23B, 23E, 24B, 24E, 25B, and 25E show astigmatism, and FIGS. 10C, 10F, 10I, 11C, 11F, 11I, 12C, 12F, 12I, 13C, 13F, 13I, 14C, 14F, 14I, 15C, 15F, 15I, 16C, 16F, 16I, 17C, 17F, 17I, 18C, 18F, 18I, 19C, 19F, 20C, 20F, 21C, 21F, 22C, 22F, 23C, 23F, 24C, 24F, 25C, and 25F show distortion. In these diagrams, Y' represents the maximum image height (mm). In the diagrams showing spherical aberration, a solid line d and a dash-and-dot line g show the spherical aberration for the d-line and for the g-line, respectively, and a broken line SC shows the sine condition. In the diagrams showing astigmatism, a broken line DM and a solid line DS represent the astigmatism for the d-line on the meridional plane and on the sagittal plane, respectively. In the diagrams showing distortion, a solid line represents the distortion (%) for the d-line.

TABLE 1

Construction Data of Example 1
$f = 7.5\sim25.5\sim50.6$, FNO = $2.55\sim2.96\sim3.60$

| Radius of Curvature | Axial Distance | Refractive Index | Abbe Number |
|---|---|---|---|
| r1 = 63.832 | | | |
| | d1 = 1.200 | N1 = 1.74000 | ν1 = 28.26 |
| r2 = 46.105 | | | |
| | d2 = 4.909 | N2 = 1.49310 | ν2 = 83.58 |
| r3 = 557.712 | | | |
| | d3 = 0.100 | | |
| r4 = 41.139 | | | |
| | d4 = 3.518 | N3 = 1.49310 | ν3 = 83.58 |
| r5 = 95.433 | | | |
| | d5 = 1.000~28.553~40.964 | | |
| r6 = 28.766 | | | |
| | d6 = 0.800 | N4 = 1.80420 | ν4 = 46.50 |
| r7 = 8.145 | | | |
| | d7 = 6.254 | | |
| r8 = −24.683 | | | |
| | d8 = 0.800 | N5 = 1.80741 | ν5 = 31.59 |
| r9 = 408.759 | | | |
| | d9 = 2.972 | N6 = 1.84666 | ν6 = 23.82 |
| r10 = −15.616 | | | |
| | d10 = 0.727 | | |
| r11 = −12.222 | | | |
| | d11 = 0.800 | N7 = 1.52510 | ν7 = 56.38 |
| r12* = −72.536 | | | |
| | d12 = 24.622~4.490~1.000 | | |
| r13 = ∞(ST) | | | |
| | d13 = 0.800 | | |
| r14 = 11.863 | | | |
| | d14 2.033 | N8 = 1.78831 | ν8 = 47.32 |
| r15 = 212.313 | | | |
| | d15 = 5.251 | | |
| r16 = −66.079 | | | |
| | d16 = 1.795 | N9 = 1.48749 | ν9 = 70.44 |
| r17 = −10.997 | | | |
| | d17 = 0.800 | N10 = 1.84666 | ν10 = 23.82 |
| r18* = 29.156 | | | |
| | d18 = 0.100 | | |
| r19 = 12.934 | | | |
| | d19 = 3.092 | N11 = 1.48749 | ν11 = 70.44 |
| r20* = −19.433 | | | |
| | d20 = 0.100 | | |
| r21 = −788.619 | | | |
| | d21 = 4.662 | N12 = 1.79850 | ν12 = 22.60 |
| r22 = −27.115 | | | |
| | d22 = 1.000~7.000~1.000 | | |
| r23 = 23.066 | | | |
| | d23 = 0.800 | N13 = 1.85000 | ν13 = 40.04 |
| r24 = 11.361 | | | |
| | d24 = 3.500 | | |
| r25 = 11.740 | | | |
| | d25 = 1.826 | N14 = 1.79850 | ν14 = 22.60 |
| r26 = 14.538 | | | |
| | d26 = 2.381~2.000~13.578 | | |
| r27 = ∞ | | | |
| | d27 = 3.000 | N15 = 1.51680 | ν15 = 64.20 |
| r28 = ∞ | | | |

Aspherical Surface Data of Surface r12
$\epsilon = 1.0000$, $A4 = -0.90791 \times 10^{-4}$, $A6 = -0.27514 \times 10^{-6}$, $A8 = -0.37035 \times 10^{-8}$
Aspherical Surface Data of Surface r18
$\epsilon = 1.0000$, $A4 = 0.28853 \times 10^{-3}$, $A6 = 0.12716 \times 10^{-5}$, $A8 = 0.10778 \times 10^{-7}$
Aspherical Surface Data of Surface r20
$\epsilon = 1.0000$

TABLE 2

Construction Data of Example 2
$f = 7.5\sim25.5\sim50.6$, FNO = $2.48\sim3.07\sim3.60$

| Radius of Curvature | Axial Distance | Refractive Index | Abbe Number |
|---|---|---|---|
| r1 = 62.012 | | | |
| | d1 = 1.200 | N1 = 1.79850 | ν1 = 22.60 |
| r2 = 50.059 | | | |
| | d2 = 3.893 | N2 = 1.49310 | ν2 = 83.58 |
| r3 = 264.139 | | | |
| | d3 = 0.100 | | |
| r4 = 57.561 | | | |
| | d4 = 2.818 | N3 = 1.49310 | ν3 = 83.58 |
| r5 = 155.066 | | | |
| | d5 = 1.000~30.739~48.448 | | |
| r6 = 29.965 | | | |
| | d6 = 0.800 | N4 = 1.75450 | ν4 = 51.57 |
| r7 = 9.032 | | | |
| | d7 = 7.570 | | |
| r8 = −52.559 | | | |
| | d8 = 0.800 | N5 = 1.75450 | ν5 = 51.57 |
| r9 = 21.530 | | | |
| | d9 = 4.134 | N6 = 1.79850 | ν6 = 22.60 |
| r10 = −18.800 | | | |
| | d10 = 0.486 | | |
| r11 = −15.910 | | | |
| | d11 = 0.800 | N7 = 1.84666 | ν7 = 23.82 |
| r12* = −107.564 | | | |
| | d12 = 25.513~4.405~1.000 | | |
| r13 = ∞(ST) | | | |
| | d13 = 0.800 | | |
| r14 = 13.086 | | | |
| | d14 = 1.832 | N8 = 1.80750 | ν8 = 35.43 |
| r15 = 84.611 | | | |
| | d15 = 3.644 | | |
| r16 = 15.627 | | | |
| | d16 = 2.756 | N9 = 1.75450 | ν9 = 51.57 |
| r17 = −12.357 | | | |
| | d17 = 0.800 | N10 = 1.84666 | ν10 = 23.82 |
| r18 = 9.111 | | | |
| | d18 = 0.100 | | |
| r19 = 7.143 | | | |
| | d19 = 1.343 | N11 = 1.52510 | ν11 = 56.38 |
| r20* = 13.828 | | | |
| | d20 = 2.118 | | |
| r21 = 31.671 | | | |
| | d21 = 1.530 | N12 = 1.79850 | ν12 = 22.60 |
| r22 = −35.431 | | | |
| | d22 = 1.000~5.669~4.095 | | |
| r23 = 26.961 | | | |
| | d23 = 0.800 | N13 = 1.85000 | ν13 = 40.04 |
| r24 = 9.331 | | | |
| | d24 = 2.307 | | |
| r25 = 11.028 | | | |
| | d25 = 1.289 | N14 = 1.79850 | ν14 = 22.60 |
| r26 = 14.503 | | | |
| | d26 = 2.123~2.989~8.644 | | |
| r27 = −130.604 | | | |
| | d27 = 1.347 | N15 = 1.79850 | ν15 = 22.60 |
| r28 = −33.480 | | | |
| | d28 = 0.858 | | |
| r29 = ∞ | | | |
| | d29 = 3.000 | N16 = 1.51680 | ν16 = 64.20 |
| r30 = ∞ | | | |

Aspherical Surface Data of Surface r12
$\epsilon = 1.0000$, $A4 = -0.44023 \times 10^{-4}$, $A6 = -0.52908 \times 10^{-7}$, $A8 = -0.21921 \times 10^{-8}$
Aspherical Surface Data of Surface r20
$\epsilon = 1.0000$, $A4 = 0.52117 \times 10^{-3}$, $A6 = 0.41505 \times 10^{-5}$, $A8 = 0.98968 \times 10^{-7}$

TABLE 3

Construction Data of Example 3
f = 7.4~23.0~49.5, FNO = 2.22~2.64~3.60

| Radius of Curvature | Axial Distance | Refractive Index | Abbe Number |
|---|---|---|---|
| r1 = 63.356 | | | |
| | d1 = 1.200 | N1 = 1.79850 | ν1 = 22.60 |
| r2 = 49.435 | | | |
| | d2 = 4.655 | N2 = 1.49310 | ν2 = 83.58 |
| r3 = 579.022 | | | |
| | d3 = 0.100 | | |
| r4 = 35.101 | | | |
| | d4 = 4.695 | N3 = 1.49310 | ν3 = 83.58 |
| r5 = 120.463 | | | |
| | d5 = 1.000~20.900~28.705 | | |
| r6 = 70.488 | | | |
| | d6 = 0.800 | N4 = 1.78831 | ν4 = 47.32 |
| r7 = 8.526 | | | |
| | d7 = 5.198 | | |
| r8 = −90.436 | | | |
| | d8 = 0.800 | N5 = 1.75450 | ν5 = 51.57 |
| r9 = −785.404 | | | |
| | d9 = 2.674 | N6 = 1.84666 | ν6 = 23.82 |
| r10 = −17.628 | | | |
| | d10 = 0.515 | | |
| r11 = −14.870 | | | |
| | d11 = 0.800 | N7 = 1.48749 | ν7 = 70.44 |
| r12 = 45.809 | | | |
| | d12 = 1.366 | | |
| r13 = −26.330 | | | |
| | d13 = 1.344 | N8 = 1.84666 | ν8 = 23.82 |
| r14* = −30.311 | | | |
| | d14 = 23.018~5.870~1.000 | | |
| r15 = ∞(ST) | | | |
| | d15 = 0.800 | | |
| r16 = 11.633 | | | |
| | d16 = 2.165 | N9 = 1.80420 | ν9 = 46.50 |
| r17 = 78.024 | | | |
| | d17 = 4.756 | | |
| r18 = −96.322 | | | |
| | d18 = 1.561 | N10 = 1.75450 | ν10 = 51.57 |
| r19 = −14.086 | | | |
| | d19 = 0.800 | N11 = 1.84666 | ν11 = 23.82 |
| r20* = 20.484 | | | |
| | d20 = 0.155 | | |
| r21 = 10.937 | | | |
| | d21 = 2.506 | N12 = 1.48749 | ν12 = 70.44 |
| r22* = −29.274 | | | |
| | d22 = 2.186 | | |
| r23 = 90.101 | | | |
| | d23 = 1.374 | N13 = 1.79850 | ν13 = 22.60 |
| r24 = −61.263 | | | |
| | d24 = 1.000~4.206~1.000 | | |
| r25 = 29.977 | | | |
| | d25 = 0.800 | N14 = 1.85000 | ν14 = 40.04 |
| r26 = 10.683 | | | |
| | d26 = 3.356 | | |
| r27 = 11.252 | | | |
| | d27 = 1.235 | N15 = 1.79850 | ν15 = 22.60 |
| r28 = 13.786 | | | |
| | d28 = 1.399~3.217~16.734 | | |
| r29 = 22.159 | | | |
| | d29 = 1.546 | N16 = 1.79850 | ν16 = 22.60 |
| r30 = 89.583 | | | |
| | d30 = 1.176 | | |
| r31 = ∞ | | | |
| | d31 = 3.000 | N17 = 1.51680 | ν17 = 64.20 |
| r32 = ∞ | | | |

Aspherical Surface Data of Surface r14
$\epsilon = 1.0000, A4 = -0.55658 \times 10^{-4}, A6 = -0.18456 \times 10^{-6}, A8 = -0.60664 \times 10^{-8}$
Aspherical Surface Data of Surface r20
$\epsilon = 1.0000, A4 = 0.28248 \times 10^{-3}, A6 = 0.17454 \times 10^{-5}, A8 = 0.32532 \times 10^{-7}$
Aspherical Surface Data of Surface r22
$\epsilon = 1.0000$

TABLE 4

Construction Data of Example 4
f = 7.4~35.9~49.6, FNO = 2.88~3.04~3.63

| Radius of Curvature | Axial Distance | Refractive Index | Abbe Number |
|---|---|---|---|
| r1 = 60.590 | | | |
| | d1 = 1.200 | N1 = 1.84666 | ν1 = 23.82 |
| r2 = 47.616 | | | |
| | d2 = 5.549 | N2 = 1.49310 | ν2 = 83.58 |
| r3 = 603.843 | | | |
| | d3 = 0.100 | | |
| r4 = 39.319 | | | |
| | d4 = 4.325 | N3 = 1.49310 | ν3 = 83.58 |
| r5 = 105.185 | | | |
| | d5 = 1.000~32.186~36.134 | | |
| r6 = 50.395 | | | |
| | d6 = 0.800 | N4 = 1.85000 | ν4 = 40.04 |
| r7 = 8.808 | | | |
| | d7 = 5.350 | | |
| r8 = −22.935 | | | |
| | d8 = 0.800 | N5 = 1.85000 | ν5 = 40.04 |
| r9 = 16.429 | | | |
| | d9 = 5.107 | N6 = 1.71736 | ν6 = 29.50 |
| r10 = −17.500 | | | |
| | d10 = 0.100 | | |
| r11* = 54.395 | | | |
| | d11 = 2.000 | N7 = 1.84506 | ν7 = 23.66 |
| r12 = 1000.000 | | | |
| | d12 = 1.278 | | |
| r13 = −19.690 | | | |
| | d13 = 0.800 | N8 = 1.75450 | ν8 = 51.57 |
| r14 = −77.927 | | | |
| | d14 = 22.063~4.444~1.300 | | |
| r15 = ∞(ST) | | | |
| | d15 = 0.800 | | |
| r16 = 12.783 | | | |
| | d16 = 2.898 | N9 = 1.85000 | ν9 = 40.04 |
| r17 = 105.738 | | | |
| | d17 = 3.453 | | |
| r18* = 37.506 | | | |
| | d18 = 2.226 | N10 = 1.84506 | ν10 = 23.66 |
| r19 = 9.939 | | | |
| | d19 = 1.104 | | |
| r20 = 12.962 | | | |
| | d20 = 4.135 | N11 = 1.69680 | ν11 = 55.43 |
| r21 = −8.915 | | | |
| | d21 = 0.800 | N12 = 1.84666 | ν12 = 23.82 |
| r22 = 26007.802 | | | |
| | d22 = 1.396 | | |
| r23 = 186.617 | | | |
| | d23 = 2.183 | N13 = 1.83350 | ν13 = 21.00 |
| r24 = −21.147 | | | |
| | d24 = 1.810~6.450~1.000 | | |

TABLE 4-continued

Construction Data of Example 4
f = 7.4~35.9~49.6, FNO = 2.88~3.04~3.63

| Radius of Curvature | Axial Distance | Refractive Index | Abbe Number |
|---|---|---|---|
| r25 = 38.703 | | | |
| | d25 = 0.800 | N14 = 1.85000 | ν14 = 40.04 |
| r26 = 13.436 | | | |
| | d26 = 4.085 | | |
| r27 = 14.114 | | | |
| | d27 = 1.362 | N15 = 1.83350 | ν15 = 21.00 |
| r28 = 18.526 | | | |
| | d28 = 1.000~5.337~17.559 | | |
| r29 = 16.513 | | | |
| | d29 = 1.967 | N16 = 1.48749 | ν16 = 70.44 |
| r30 = 44.597 | | | |
| | d30 = 1.479 | | |
| r31 = ∞ | | | |
| | d31 = 3.000 | N17 = 1.51680 | ν17 = 64.20 |
| r32 = ∞ | | | |

Aspherical Surface Data of Surface r11
$\epsilon = 1.0000$, $A4 = 0.40063 \times 10^{-4}$, $A6 = 0.39528 \times 10^{-6}$, $A8 = -0.29922 \times 10^{-8}$
Aspherical Surface Data of Surface r18
$\epsilon = 1.0000$, $A4 = -0.11545 \times 10^{-3}$, $A6 = -0.96168 \times 10^{6}$, $A8 = 0.16989 \times 10^{-7}$

TABLE 5

Construction Data of Example 5
f = 8.9~33.7~84.8, FNO = 2.43~3.17~3.60

| Radius of Curvature | Axial Distance | Refractive Index | Abbe Number |
|---|---|---|---|
| r1 = 171.427 | | | |
| | d1 = 1.497 | N1 = 1.84666 | ν1 = 23.82 |
| r2 = 114.665 | | | |
| | d2 = 6.918 | N2 = 1.49310 | ν2 = 83.58 |
| r3 = −850.123 | | | |
| | d3 = 0.100 | | |
| r4 = 96.816 | | | |
| | d4 = 4.523 | N3 = 1.49310 | ν3 = 83.58 |
| r5 = 348.049 | | | |
| | d5 = 2.486~40.898~95.614 | | |
| r6* = 24.483 | | | |
| | d6 = 2.000 | N4 = 1.75450 | ν4 = 51.57 |
| r7 = 12.754 | | | |
| | d7 = 11.729 | | |
| r8 = −33.584 | | | |
| | d8 = 0.800 | N5 = 1.52208 | ν5 = 65.92 |
| r9 = 21.063 | | | |
| | d9 = 4.926 | N6 = 1.84705 | ν6 = 25.00 |
| r10 = 81.045 | | | |
| | d10 = 0.838 | | |
| r11 = −40.184 | | | |
| | d11 = .800 | 7 = 1.74495 | 7 = 24.47 |
| r12 = 99.136 | | | |
| | d12 = 41.883~2.565~1.250 | | |
| r13 = ∞(ST) | | | |
| | d13 = 1.500 | | |
| r14 = 12.436 | | | |
| | d14 = 3.485 | N8 = 1.75450 | νν = 51.57 |
| r15 = −172.448 | | | |
| | d15 = 1.166 | | |
| r16 = 375.028 | | | |
| | d16 = 0.800 | N9 = 1.71675 | ν9 = 26.91 |
| r17 = 30.185 | | | |
| | d17 = 1.000~1.169~1.244 | | |
| r18* = 16.888 | | | |
| | d18 = 1.922 | N10 = 1.84666 | ν10 = 23.82 |

TABLE 5-continued

Construction Data of Example 5
f = 8.9~33.7~84.8, FNO = 2.43~3.17~3.60

| Radius of Curvature | Axial Distance | Refractive Index | Abbe Number |
|---|---|---|---|
| r19 = 11.475 | | | |
| | d19 = 1.988~11.017~23.820 | | |
| r20* = 25.613 | | | |
| | d20 = 0.800 | N11 = 1.75000 | ν11 = 25.14 |
| r21 = 14.963 | | | |
| | d21 = 0.077 | | |
| r22 = 15.312 | | | |
| | d22 = 1.202 | N12 = 1.75450 | ν12 = 51.57 |
| r23 = 16.980 | | | |
| | d23 = 0.356 | | |
| r24 = 16.249 | | | |
| | d24 = 6.391 | N13 = 1.49310 | ν13 = 83.58 |
| r25 = −22.015 | | | |
| | d25 = 1.962 | | |
| r26 = −13.823 | | | |
| | d26 = 3.437 | N14 = 1.84666 | ν14 = 23.82 |
| r27 = −14.151 | | | |
| | d27 = 2.000~12.427~6.704 | | |
| r28* = 20.728 | | | |
| | d28 = 2.834 | N15 = 1.52510 | ν15 = 56.38 |
| r29 = 15.822 | | | |
| | d29 = 1.307 | | |
| r30 = ∞ | | | |
| | d30 = 3.000 | N16 = 1.51680 | ν16 = 64.20 |
| r31 = ∞ | | | |

Aspherical Surface Data of Surface r6
$\epsilon = 1.0000$, $A4 = 0.66358 \times 10^{-5}$, $A6 = 0.71481 \times 10^{-9}$, $A8 = 0.49766 \times 10^{-10}$
Aspherical Surface Data of Surface r18
$\epsilon = 1.0000$, $A4 = -0.10218 \times 10^{-3}$, $A6 = -0.12797 \times 10^{-5}$, $A8 = 0.10173 \times 10^{-7}$, $A10 = -0.34395 \times 10^{-9}$
Aspherical Surface Data of Surface r20
$\epsilon = 1.0000$, $A4 = -0.34705 \times 10^{-4}$, $A6 = 0.10595 \times 10^{-6}$, $A8 = -0.43764 \times 10^{-8}$, $A10 = 0.17721 \times 10^{-10}$
Aspherical Surface Data of Surface r28
$\epsilon = 1.0000$, $A4 = -0.59570 \times 10^{-5}$, $A6 = -0.55853 \times 10^{-6}$, $A8 = 0.11878 \times 10^{-7}$, $A10 = -0.14101 \times 10^{-9}$

TABLE 6

Construction Data of Example 6
f = 7.1~53.0~68.6, FNO = 2.55~3.60~3.60

| Radius of Curvature | Axial Distance | Refractive Index | Abbe Number |
|---|---|---|---|
| r1 = 81.309 | | | |
| | d1 = 1.400 | N1 = 1.84666 | ν1 = 23.86 |
| r2 = 63.920 | | | |
| | d2 = 4.957 | N2 = 1.49310 | ν2 = 83.58 |
| r3 = −2566.999 | | | |
| | d3 = 0.100 | | |
| r4 = 72.424 | | | |
| | d4 = 2.914 | N3 = 1.49310 | ν3 = 83.58 |
| r5 = 204.372 | | | |
| | d5 = 0.900~54.218~57.909 | | |
| r6* = −2187.849 | | | |
| | d6 = 1.200 | N4 = 1.77250 | ν4 = 49.77 |
| r7* = 14.815 | | | |
| | d7 = 8.614 | | |
| r8 = −22.207 | | | |
| | d8 = 1.500 | N5 = 1.84668 | ν5 = 23.86 |
| r9 = −39.485 | | | |
| | d9 = 0.100 | | |
| r10 = 528.712 | | | |
| | d10 = 4.283 | N6 = 1.84666 | ν6 = 23.82 |
| r11 = −27.851 | | | |
| | d11 = 1.412 | | |

TABLE 6-continued

Construction Data of Example 6
f = 7.1~53.0~68.6, FNO = 2.55~3.60~3.60

| Radius of Curvature | Axial Distance | Refractive Index | Abbe Number |
|---|---|---|---|
| r12 = −19.591 | | | |
| | d12 = 1.000 | N7 = 1.49310 | ν7 = 83.58 |
| r13 = −80.805 | | | |
| | d13 = 40.111~ 0.619~0.100 | | |
| r14 = ∞(ST) | | | |
| | d14 = 1.200 | | |
| r15* = 20.034 | | | |
| | d15 = 3.327 | N8 = 1.77112 | ν8 = 48.87 |
| r16 = 2658.231 | | | |
| | d16 = 0.100 | | |
| r17 = 24.453 | | | |
| | d17 = 1.028 | N9 = 1.61287 | ν9 = 33.36 |
| r18* = 9.473 | | | |
| | d18 = 0.432 | | |
| r19 = 12.678 | | | |
| | d19 = 2.612 | N10 = 1.75450 | ν10 = 51.57 |
| r20 = −167.012 | | | |
| | d20 = 0.537~1.270~ 1.348 | | |
| r21 = −32.395 | | | |
| | d21 = 6.981 | N11 = 1.64379 | ν11 = 56.31 |
| r22 = −11.929 | | | |
| | d22 = 0.100 | | |
| r23* = −13.515 | | | |
| | d23 = 1.708 | N12 = 1.63456 | ν12 = 31.17 |
| r24* = 24.372 | | | |
| | d24 = 0.263~ 19.944~27.790 | | |
| r25 = 19.740 | | | |
| | d25 = 4.770 | N13 = 1.79850 | ν13 = 22.60 |
| r26 = 13.053 | | | |
| | d26 = 0.100 | | |
| r27 = 13.309 | | | |
| | d27 = 5.694 | N14 = 1.68636 | ν14 = 54.20 |
| r28 = −129.207 | | | |
| | d28 = 4.148~5.575~ 2.763 | | |
| r29 = ∞ | | | |
| | d29 = 3.000 | N15 = 1.51680 | ν15 = 64.20 |
| r32 = ∞ | | | |

Aspherical Surface Data of Surface r6
ϵ = 1.0000, A4 = 0.29074 × $10^{-4}$, A6 = −0.89940 × $10^{-7}$, A8 = 0.16625 × $10^{-9}$
Aspherical Surface Data of Surface r7
ϵ = 1.0000, A4 = 0.44003 × $10^{-5}$, A6 = 0.99743 × $10^{-8}$, A8 = = −0.48301 × $10^{-9}$
Aspherical Surface Data of Surface r15
ϵ = 1.0000, A4 = 0.11178 × $10^{-3}$, A6 = 0.10605 × $10^{-5}$, A8 = −0.21375 × $10^{-7}$, A10 = 0.22240 × $10^{-9}$
Aspherical Surface Data of Surface r18
ϵ = 1.0000, A4 = −0.24094 × $10^{-3}$, A6 = 0.11663 × $10^{-5}$, A8 = −0.57504 × $10^{-7}$, A10 = 0.66415 × $10^{-9}$
Aspherical Surface Data of Surface r23
ϵ = 1.0000, A4 = 0.12224 × $10^{-3}$, A6 = −0.66295 × $10^{-5}$, A8 = 0.74249 × $10^{-7}$
Aspherical Surface Data of Surface r24
ϵ = 1.0000, A4 = 0.29363 × $10^{-3}$, A6 = −0.57030 × $10^{-5}$, A8 = 0.80185 × $10^{-7}$

TABLE 7

Construction Data of Example 7
f = 7.1~49.0, FNO = 2.50~3.03~3.66

| Radius of Curvature | Axial Distance | Refractive Index | Abbe Number |
|---|---|---|---|
| r1 = 111.111 | | | |
| | d1 = 1.400 | N1 = 1.79850 | ν1 = 22.60 |
| r2 = 85.390 | | | |
| | d2 = 4.303 | N2 = 1.49310 | ν2 = 83.58 |
| r3 = −1831.972 | | | |
| | d3 = 0.100 | | |
| r4 = 43.431 | | | |
| | d4 = 4.988 | N3 = 1.49310 | ν3 = 83.58 |
| r5 = 130.083 | | | |
| | d5 = 0.900~24.171~ 43.681 | | |
| r6 = 35.035 | | | |
| | d6 = 1.200 | N4 = 1.75450 | ν4 = 51.57 |
| r7 = 10.040 | | | |
| | d7 = 4.791 | | |
| r8 = −96.605 | | | |
| | d8 = 1.100 | N5 = 1.755450 | ν5 = 51.57 |
| r9 = 15.175 | | | |
| | d9 = 1.925 | | |
| r10* = 25.398 | | | |
| | d10 = 3.981 | N6 = 1.84666 | ν6 = 23.82 |
| r11* = −43.373 | | | |
| | d11 = 1.258 | | |
| r12 = −15.932 | | | |
| | d12 = 1.000 | N7 = 1.48749 | ν7 = 70.44 |
| r13 = −134.899 | | | |
| | d13 = 20.871~5.426~ 0.600 | | |
| r14 = ∞(ST) | | | |
| | d14 = 0.600 | | |
| r15 = 11.251 | | | |
| | d15 = 2.129 | N8 = 1.755450 | ν8 = 51.57 |
| r16 = 422.558 | | | |
| | d16 = 4.585 | | |
| r17* = −39.509 | | | |
| | d17 = 1.500 | N9 = 1.70395 | ν9 = 26.41 |
| r18* = 12.891 | | | |
| | d18 = 0.596 | | |
| r19 = 12.874 | | | |
| | d19 = 2.614 | N10 = 1.48749 | ν10 = 70.44 |
| r20 = −14.240 | | | |
| | d20 = 1.806~1.837~ 3.682 | | |
| r21 = −8157.937 | | | |
| | d21 = 0.800 | N11 = 1.71649 | ν11 = 25.74 |
| r22 = 13.228 | | | |
| | d22 = 0.445 | | |
| r23 = 13.631 | | | |
| | d23 = 1.919 | N12 = 1.48749 | ν12 = 70.44 |
| r24 = 668.856 | | | |
| | d24 = 3.002~1.300~ 12.240 | | |
| r25 = 31.322 | | | |
| | d25 = 1.691 | N13 = 1.79850 | ν13 = 22.60 |
| r26 = −217.261 | | | |
| | d26 = 0.500~9.743~ 7.994 | | |
| r27 = −18.461 | | | |
| | d27 = 4.643 | N14 = 1.79850 | ν14 = 22.60 |
| r28 = −11.955 | | | |
| | d28 = 0.460 | N15 = 1.83724 | ν15 = 30.17 |
| r26 = 21.532 | | | |
| | d29 = 0.900 | | |

TABLE 7-continued

Construction Data of Example 7
f = 7.1~49.0, FNO = 2.50~3.03~3.66

| Radius of Curvature | Axial Distance | Refractive Index | Abbe Number |
|---|---|---|---|
| r30 = ∞ | | | |
| | d27 = 3.000 | N16 = 1.51680 | ν16 = 64.20 |
| r31 = ∞ | | | |

Aspherical Surface Data of Surface r10
$\epsilon = 1.0000, A4 = 0.34767 \times 10^{-4}, A6 = 0.63939 \times 10^{-7}, A8 = -0.15659 \times 10^{-8}$
Aspherical Surface Data of Surface r11
$\epsilon = 1.0000, A4 = -0.11239 \times 10^{-4}, A6 = -0.50907 \times 10^{-7}, A8 = 0.20881 \times 10^{-7}, A10 = -0.34395 \times 10^{-8}$
Aspherical Surface Data of Surface r17
$\epsilon = 1.0000, A4 = -0.53164 \times 10^{-3}, A6 = 0.11706 \times 10^{-4}, A8 = -0.13639 \times 10^{-8}, A10 = 0.17721 \times 10^{-6}$
Aspherical Surface Data of Surface r18
$\epsilon = 1.0000, A4 = -0.23930 \times 10^{-3}, A6 = 0.14046 \times 10^{-4}, A8 = -0.15638 \times 10^{-7}, A10 = -0.14101 \times 10^{-6}$

TABLE 8

Construction Data of Example 8
f = 7.5~45.0~71.5, FNO = 2.17~2.89~3.60

| Radius of Curvature | Axial Distance | Refractive Index | Abbe Number |
|---|---|---|---|
| r1 = 65.664 | | | |
| | d1 = 1.200 | N1 = 1.75518 | ν = 129.92 |
| r2 = 47.591 | | | |
| | d2 = 5.244 | N2 = 1.49310 | ν2 = 83.58 |
| r3 = 217.318 | | | |
| | d3 = 0.100 | | |
| r4 = 51.066 | | | |
| | d4 = 4.398 | N3 = 1.49310 | ν3 = 83.58 |
| r5 = 185.539 | | | |
| | d5 = 1.000~45.300~49.091 | | |
| r6 = 45.239 | | | |
| | d6 = 0.800 | N4 = 1.75450 | ν4 = 51.57 |
| r7 = 10.516 | | | |
| | d7 = 7.570 | | |
| r8 = −40.143 | | | |
| | d8 = 0.800 | N5 = 1.80223 | ν5 = 44.75 |
| r9 = 23.630 | | | |
| | d9 = 5.046 | N6 = 1.79123 | ν6 = 22.82 |
| r10 = −18.887 | | | |
| | d10 = 0.656 | | |
| r11 = −15.690 | | | |
| | d11 = 0.800 | N7 = 1.84666 | ν7 = 23.82 |
| r12* = −43.100 | | | |
| | d12 = 35.75~5.453~4.000 | | |
| r13 = ∞(ST) | | | |
| | d13 = 0.800 | | |
| r14 = 13.866 | | | |
| | d14 = 2.194 | N8 = 1.78923 | ν8 = 46.34 |
| r15 = 74.387 | | | |
| | d15 = 5.348 | | |
| r16 = 13.726 | | | |
| | d16 = 3.113 | N9 = 1.73284 | ν9 = 52.33 |
| r17 = −13.373 | | | |
| | d17 = 0.800 | N10 = 1.84758 | ν10 = 26.81 |
| r18 = 8.964 | | | |
| | d18 = 0.100 | | |
| r19 = 7.206 | | | |
| | d19 = 1.439 | N11 = 1.52510 | ν11 = 56.38 |
| r20* = 14.351 | | | |
| | d20 = 2.601 | | |
| r21 = 21.969 | | | |
| | d21 = 1.379 | N12 = 1.79850 | ν12 = 22.60 |
| r22 = −1723.989 | | | |
| | d22 = 1.000~3.838~2.749 | | |

TABLE 8-continued

Construction Data of Example 8
f = 7.5~45.0~71.5, FNO = 2.17~2.89~3.60

| Radius of Curvature | Axial Distance | Refractive Index | Abbe Number |
|---|---|---|---|
| r23 = 342.635 | | | |
| | d23 = 0.800 | N13 = 1.66384 | ν13 = 35.98 |
| r24 = 8.966 | | | |
| | d24 = 3.000 | | |
| r25 = 24.255 | | | |
| | d25 = 1.566 | N14 = 1.79850 | ν14 = 22.60 |
| r26* = 120.635 | | | |
| | d26 = 1.000~5.947~14.698 | | |
| r27 = 25.459 | | | |
| | d27 = 1.667 | N15 = 1.79850 | ν15 = 22.60 |
| r28 = 884.189 | | | |
| | d28 = 1.019 | | |
| r29 = ∞ | | | |
| | d29 = 3.000 | N16 = 1.51680 | ν16 = 64.20 |
| r30 = ∞ | | | |

Aspherical Surface Data of Surface r12
$\epsilon = 1.0000, A4 = -0.28880 \times 10^{-4}, A6 = -0.39221 \times 10^{-7}, A8 = -0.58769 \times 10^{-9}$
Aspherical Surface Data of Surface r20
$\epsilon = 1.0000, A4 = 0.44180 \times 10^{-3}, A6 = 0.35794 \times 10^{-5}, A8 = 0.93325 \times 10^{-7}$
Aspherical Surface Data of Surface r26
$\epsilon = 1.0000, A4 = -0.73523 \times 10^{-4}, A6 = -0.60792 \times 10^{-6}, A8 = -0.59550 \times 10^{-8}$

TABLE 9

Construction Data of Example 9
f = 7.5~54.0~86.0, FNO = 2.10~2.84~3.60

| Radius of Curvature | Axial Distance | Refractive Index | Abbe Number |
|---|---|---|---|
| r1 = 90.273 | | | |
| | d1 = 1.200 | N1 = 1.83304 | ν1 = 41.53 |
| r2 = 50.609 | | | |
| | d2 = 6.584 | N2 = 1.49310 | ν2 = 83.58 |
| r3 = 491.903 | | | |
| | d3 = 0.100 | | |
| r4 = 50.212 | | | |
| | d4 = 5.970 | N3 = 1.49310 | ν3 = 83.58 |
| r5 = 293.841 | | | |
| | d5 = 1.000~56.319~60.499 | | |
| r6 = 53.739 | | | |
| | d6 = 0.800 | N4 = 1.75450 | ν4 = 51.57 |
| r7 = 11.112 | | | |
| | d7 = 7.570 | | |
| r8 = −105.475 | | | |
| | d8 = 0.800 | N5 = 1.76442 | ν5 = 49.91 |
| r9 = 16.958 | | | |
| | d9 = 6.473 | N6 = 1.77039 | ν6 = 23.51 |
| r10 = −22.262 | | | |
| | d10 = 0.563 | | |
| r11 = −19.229 | | | |
| | d11 = 0.800 | N7 = 1.84666 | ν7 = 23.82 |
| r12* = −140.106 | | | |
| | d12 = 34.166~4.250~1.000 | | |
| r13 = ∞(ST) | | | |
| | d13 = 0.800 | | |
| r14 = 14.098 | | | |
| | d14 = 2.180 | N8 = 1.83255 | ν8 = 41.58 |
| r15 = 75.309 | | | |
| | d15 = 4.215 | | |
| r16 = 13.256 | | | |
| | d16 = 3.141 | N9 = 1.71070 | ν9 = 53.17 |
| r17 = −15.268 | | | |
| | d17 = 0.800 | N10 = 1.80992 | ν10 = 25.83 |

TABLE 9-continued

Construction Data of Example 9
f = 7.5~54.0~86.0, FNO = 2.10~2.84~3.60

| Radius of Curvature | Axial Distance | Refractive Index | Abbe Number |
|---|---|---|---|
| r18 = 7.879 | | | |
| | d18 = 0.274 | | |
| r19 = 7.000 | | | |
| | d19 = 1.461 | N11 = 1.52510 | ν11 = 56.38 |
| r20* = 13.820 | | | |
| | d20 = 3.133 | | |
| r21 = 21.375 | | | |
| | d21 = 1.301 | N12 '2+1.79850 | ν12 = 22.60 |
| r22 = 2254.283 | | | |
| | d22 = 1.000~3.613~1.086 | | |
| r23 = 2109.616 | | | |
| | d23 = 0.800 | N13 = 1.64794 | ν13 = 36.75 |
| r24 = 9.838 | | | |
| | d24 = 2.907 | | |
| r25 = 21.069 | | | |
| | d25 = 1.316 | N14 = 1.79850 | ν14 = 22.60 |
| r26* = 59.731 | | | |
| | d26 = 1.000~6.745~18.339 | | |
| r27 = 21.610 | | | |
| | d27 = 1.710 | N15 = 1.84666 | ν15 = 23.82 |
| r28 = 97.515 | | | |
| | d28 = 1.154 | | |
| r29 = ∞ | | | |
| | d31 = 3.000 | N16 = 1.51680 | ν16 = 64.20 |
| r30 = ∞ | | | |

Aspherical Surface Data of Surface r12
$\epsilon = 1.0000$, $A4 = -0.26006 \times 10^{-4}$, $A6 = -0.12948 \times 10^{-7}$, $A8 = -0.69799 \times 10^{-9}$ Aspherical Surface Data of Surface r20
$\epsilon = 1.0000$, $A4 = 0.39398 \times 10^{-3}$, $A6 = 0.33896 \times 10^{-5}$, $A8 = 0.11071 \times 10^{-6}$ Aspherical Surface Data of Surface r26
$\epsilon = 1.0000$, $A4 = -0.53134 \times 10^{-4}$, $A6 = -0.59377 \times 10^{-6}$, $A8 = 0.30506 \times 10^{-8}$

TABLE 10

Focusing Data
Focusing Unit: Fourth Lens Unit (Gr4)
Shooting Distance (from Object Point to Image Plane): D = 0.5 (m)

| | Movement Distance of Focusing Unit | | | Movement Direction of Focusing Unit: |
|---|---|---|---|---|
| | W | M | T | Toward |
| Example 1 | 0.29 | 3.717 | 5.181 | Image Plane |
| Example 2 | 0.144 | 1.448 | 3.372 | ImagePlane |
| Example 3 | 0.172 | 1.360 | 4.638 | ImagePlane |
| Example 4 | 0.234 | 3.393 | 3.349 | Image Plane |
| Example 5 | 0.264 | 2.549 | 9.552 | Object |
| Example 6 | 0.163 | 5.338 | 7.961 | Object |
| Example 7 | 0.314 | 1.929 | 8.601 | Image Plane |
| Example 8 | 0.133 | 2.754 | 4.258 | Image Plane |
| Example 9 | 0.155 | 4.251 | 5.783 | Image Plane |

TABLE 11

Actual Values of Conditional Formulae

| | Conditional Formula (1) f1/fT | Conditional Formula (2) \|f4/fT\| | Conditional Formula (3) $D_{34W}/D_{34T}$ | Conditional Formula (4) $\beta_{W4}$ |
|---|---|---|---|---|
| Example 1 | 1.65 | 0.95 | 1.00 | 1.20 |
| Example 2 | 1.90 | 0.59 | 0.26 | 1.36 |
| Example 3 | 1.30 | 0.60 | 1.00 | 1.34 |
| Example 4 | 1.48 | 0.86 | 1.81 | 1.35 |
| Example 5 | 1.93 | 0.60 | 0.80 | 1.63 |
| Example 6 | 1.54 | 0.36 | 0.40 | 2.36 |
| Example 7 | 1.27 | 0.79 | 0.37 | 1.40 |
| Example 8 | 1.30 | 0.35 | 0.36 | 1.58 |
| Example 9 | 1.21 | 0.32 | 0.92 | 1.52 |

What is claimed is:

1. An optical device comprising:

a zoom lens system having an optical system which comprises a plurality of lens units and which achieves zooming by varying unit-to-unit distances; and an image sensor for converting an optical image formed by the zoom lens system into an electrical signal, wherein the zoom lens system comprises at least, from an object side thereof to an image side thereof, a first lens unit having a positive optical power, a second lens unit having a negative optical power, a third lens unit having a positive optical power, and a fourth lens unit having a negative optical power, and the following conditional formula is fulfilled:

$$1.1 < f1/fT < 2.5$$

where f1 represents a focal length of the first lens unit; and fT represents a focal length of an entirety of said optical system at a telephoto end.

2. An optical device as claimed in claim 1, wherein focusing is achieved by moving the fourth lens unit along an optical axis, and the following conditional formula is additionally fulfilled:

$$0.3 < |f4/fT| < 2$$

where f4 represents a focal length of the fourth lens unit; and fT represents the focal length of the entirety of said optical system at the telephoto end.

3. An optical device as claimed in claim 2, wherein, as zooming is performed from a wide-angle end to the telephoto end, the first lens unit is moved and a distance between the third lens unit and the fourth lens unit increases from the wide-angle end to a middle-focal-length position and decreases from the middle-focal-length position to the telephoto end.

4. An optical device as claimed in claim 2 wherein the second lens unit has an aspherical surface.

5. An optical device as claimed in claim 1, wherein, as zooming is performed from a wide-angle end to the telephoto end, the first lens unit is moved and a distance between the third lens unit and the fourth lens unit increases from the wide-angle end to a middle-focal-length position and decreases from the middle-focal-length position to the telephoto end.

6. An optical device as claimed in claim 1 further comprising a low-pass filter, said low-pass filter located between the first lens unit and the image sensor, wherein the low-pass filter adjusts spatial frequency characteristics of the optical image formed by the zoom lens system.

7. An optical device as claimed in claim 6 wherein the low-pass filter is kept stationary during zooming.

8. An optical device as claimed in claim 1 wherein the second lens unit has an aspherical surface.

9. An optical device as claimed in claim 1 wherein the zoom lens system further comprises a fifth lens unit having a positive optical power.

10. An optical device as claimed in claim 9 wherein the zoom lens system further comprises a sixth lens unit having a negative optical power.

11. An optical device as claimed in claim 9 wherein the zoom lens system further comprises a sixth lens unit having a positive optical power.

12. A digital camera comprising:
an optical lens device, and
a memory;
wherein said optical lens device comprises a zoom lens system, having an optical system which comprises a plurality of lens units and which achieves zooming by varying unit-to-unit distances; and an image sensor for converting an optical image formed by the zoom lens system into an electrical signal;
wherein the zoom lens system comprises at least, from an object side thereof to an image side thereof, a first lens unit having a positive optical power, a second lens unit having a negative optical power, a third lens unit having a positive optical power, and a fourth lens unit having a negative optical power, and the following conditional formula is fulfilled:

$$1.1 < f1/fT < 2.5$$

where
f1 represents a focal length of the first lens unit; and
fT represents a focal length of an entirety of said optical system at a telephoto end; and
wherein said memory is adapted for storing image data from said image sensor, and said memory is not removable from said digital camera.

13. A digital camera as claimed in claim 12 wherein the following conditional formula is fulfilled:

$$0.3 < |f4/fT| < 2$$

where
f4 represents a focal length of the fourth lens unit; and
fT represents the focal length of the entirety of said optical system at the telephoto end.

14. An optical device comprising:
a zoom lens system which comprises a plurality of lens units and which achieves zooming by varying unit-to-unit distances; and
an image sensor for converting an optical image formed by the zoom lens system into an electrical signal,
wherein the zoom lens system comprises at least, from an object side thereof to an image side thereof, a first lens unit having a positive optical power, a second lens unit having a negative optical power, a third lens unit having a positive optical power, and a fourth lens unit having a negative optical power, the first lens unit being moved as zooming is performed, and
wherein the following conditional formula is fulfilled:

$$0.3 < D_{34W}/D_{34T} < 2.5$$

where
$D_{34W}$ represents an aerial distance between the third lens unit and the fourth lens unit at a wide-angle end; and
$D_{34T}$ represents an aerial distance between the third lens unit and the fourth lens unit at a telephoto end.

15. An optical device as claimed in claim 14,
wherein, as zooming is performed from the wide-angle end to the telephoto end, the fourth lens unit is moved toward the object side.

16. An optical device as claimed in claim 15,
wherein, as zooming is performed from the wide-angle end to the telephoto end, a distance between the third lens unit and the fourth lens unit increases from the wide-angle end to a middle-focal-length position and decreases from the middle-focal-length position to the telephoto end.

17. An optical device as claimed in claim 15,
wherein focusing is achieved by moving the fourth lens unit along an optical axis, and the following conditional formula is additionally fulfilled.

$$0.5 < \beta_{W4} < 2$$

where
$\beta_{W4}$ represents a lateral magnification of the fourth lens unit at the wide-angle end.

18. An optical device as claimed in claim 14,
wherein, as zooming is performed from the wide-angle end to the telephoto end, a distance between the third lens unit and the fourth lens unit increases from the wide-angle end to a middle-focal-length position and decreases from the middle-focal-length position to the telephoto end.

19. An optical device as claimed in claim 18,
wherein focusing is achieved by moving the fourth lens unit along an optical axis, and the following conditional formula is additionally fulfilled:

$$0.5 < \beta_{W4} < 2$$

where
$\beta_{W4}$ represents a lateral magnification of the fourth lens unit at the wide-angle end.

20. An optical device as claimed in claim 14,
wherein focusing is achieved by moving the fourth lens unit along an optical axis, and the following conditional formula is additionally fulfilled:

$$0.5 < \beta_{W4} < 2$$

where
$\beta_{W4}$ represents a lateral magnification of the fourth lens unit at the wide-angle end.

21. An optical device as claimed in claim 14 wherein the zoom lens system further comprises a fifth lens unit having a positive optical power.

22. An optical device as claimed in claim 21 wherein the zoom lens system further comprises a sixth lens unit having a negative optical power.

23. An optical device as claimed in claim 21 wherein the zoom lens system further comprises a sixth lens unit having a positive optical power.

24. A digital camera comprising:
an optical lens device, and
a memory;
wherein said optical lens device comprises a zoom lens system which comprises a plurality of lens units and which achieves zooming by varying unit-to-unit distances; and an image sensor for converting an optical image formed by the zoom lens system into an electrical signal;

wherein the zoom lens system comprises at least, from an object side thereof to an image side thereof, a first lens unit having a positive optical power, a second lens unit having a negative optical power, a third lens unit having a positive optical power, and a fourth lens unit having a negative optical power, the first lens unit being moved as zooming is performed, and wherein the following conditional formula is fulfilled:

$$0.3 < D_{34W}/D_{34T} < 2.5$$

where $D_{34W}$ represents an aerial distance between the third lens unit and the fourth lens unit at a wide-angle end; and $D_{34T}$ represents an aerial distance between the third lens unit and the fourth lens unit at a telephoto end; and wherein said memory is adapted for storing image data from said image sensor, and said memory is not removable from said digital camera.

25. A digital camera as claimed in claim 24 wherein the following conditional formula is fulfilled:

$$0.5 < \beta_{W4} < 2$$

where $\beta_{W4}$ represents a lateral magnification of the fourth lens unit at the wide-angle end.

* * * * *